Sept. 7, 1954 W. W. LANDSIEDEL 2,688,439

DECIMAL POINT MECHANISM

Filed Dec. 2, 1948 23 Sheets-Sheet 1

INVENTOR
WALTER W. LANDSIEDEL
BY Anthony Mantione
AGENT

Sept. 7, 1954

W. W. LANDSIEDEL 2,688,439

DECIMAL POINT MECHANISM

Filed Dec. 2, 1948

23 Sheets-Sheet 2

INVENTOR
WALTER W. LANDSIEDEL
BY Anthony Manteione
AGENT

Sept. 7, 1954

W. W. LANDSIEDEL 2,688,439

DECIMAL POINT MECHANISM

Filed Dec. 2, 1948

23 Sheets-Sheet 3

INVENTOR
WALTER W. LANDSIEDEL
BY Anthony Mantione
AGENT

INVENTOR
WALTER W. LANDSIEDEL
BY Anthony Martine
AGENT

Sept. 7, 1954 W. W. LANDSIEDEL 2,688,439

DECIMAL POINT MECHANISM

Filed Dec. 2, 1948 23 Sheets-Sheet 5

INVENTOR
WALTER W. LANDSIEDEL
BY Anthony Mantione
AGENT

Sept. 7, 1954

W. W. LANDSIEDEL 2,688,439

DECIMAL POINT MECHANISM

Filed Dec. 2, 1948

23 Sheets-Sheet 6

INVENTOR
WALTER W. LANDSIEDEL
BY Anthony Mantovine
AGENT

Sept. 7, 1954 W. W. LANDSIEDEL 2,688,439

DECIMAL POINT MECHANISM

Filed Dec. 2, 1948 23 Sheets-Sheet 7

INVENTOR
WALTER W. LANDSIEDEL
BY Anthony Mantione
AGENT

Sept. 7, 1954 W. W. LANDSIEDEL 2,688,439

DECIMAL POINT MECHANISM

Filed Dec. 2, 1948 23 Sheets-Sheet 8

INVENTOR
WALTER W. LANDSIEDEL
BY Anthony Manlione
AGENT

INVENTOR
WALTER W. LANDSIEDEL
BY Anthony Mantione
AGENT

Sept. 7, 1954 W. W. LANDSIEDEL 2,688,439

DECIMAL POINT MECHANISM

Filed Dec. 2, 1948 23 Sheets-Sheet 10

INVENTOR
WALTER W. LANDSIEDEL
BY Anthony Mantione
AGENT

Sept. 7, 1954

W. W. LANDSIEDEL 2,688,439

DECIMAL POINT MECHANISM

Filed Dec. 2, 1948

23 Sheets-Sheet 11

INVENTOR
WALTER W. LANDSIEDEL
BY Anthony Mantione
AGENT

Sept. 7, 1954 W. W. LANDSIEDEL 2,688,439

DECIMAL POINT MECHANISM

Filed Dec. 2, 1948 23 Sheets-Sheet 12

INVENTOR
WALTER W. LANDSIEDEL
BY
AGENT

Sept. 7, 1954 W. W. LANDSIEDEL 2,688,439

DECIMAL POINT MECHANISM

Filed Dec. 2, 1948 23 Sheets-Sheet 13

INVENTOR
WALTER W. LANDSIEDEL
BY Anthony Mantione
AGENT

INVENTOR
WALTER W. LANDSIEDEL
BY Anthony Mantione
AGENT

INVENTOR
WALTER W. LANDSIEDEL
BY Anthony Mantione
AGENT

Sept. 7, 1954 W. W. LANDSIEDEL 2,688,439

DECIMAL POINT MECHANISM

Filed Dec. 2, 1948 23 Sheets-Sheet 16

INVENTOR
WALTER W. LANDSIEDEL
BY Anthony Mantione
AGENT

Sept. 7, 1954 W. W. LANDSIEDEL 2,688,439

DECIMAL POINT MECHANISM

Filed Dec. 2, 1948 23 Sheets-Sheet 17

INVENTOR
WALTER W. LANDSIEDEL
BY Anthony Mantione
AGENT

INVENTOR
WALTER W. LANDSIEDEL
BY Anthony Mantione
AGENT

Sept. 7, 1954 W. W. LANDSIEDEL 2,688,439

DECIMAL POINT MECHANISM

Filed Dec. 2, 1948 23 Sheets-Sheet 19

INVENTOR
WALTER W. LANDSIEDEL
BY Anthony Mantione
AGENT

Sept. 7, 1954 W. W. LANDSIEDEL 2,688,439

DECIMAL POINT MECHANISM

Filed Dec. 2, 1948 23 Sheets-Sheet 20

INVENTOR
WALTER W. LANDSIEDEL
BY Anthony Mantione
AGENT

Sept. 7, 1954 W. W. LANDSIEDEL 2,688,439

DECIMAL POINT MECHANISM

Filed Dec. 2, 1948 23 Sheets-Sheet 21

INVENTOR
WALTER W. LANDSIEDEL
BY Anthony Mantione
AGENT

Sept. 7, 1954 W. W. LANDSIEDEL 2,688,439

DECIMAL POINT MECHANISM

Filed Dec. 2, 1948

23 Sheets-Sheet 22

INVENTOR
WALTER W. LANDSIEDEL
BY Anthony Mantione
AGENT

Sept. 7, 1954 W. W. LANDSIEDEL 2,688,439

DECIMAL POINT MECHANISM

Filed Dec. 2, 1948 23 Sheets-Sheet 23

INVENTOR
WALTER W. LANDSIEDEL
BY Anthony Martino
AGENT

Patented Sept. 7, 1954

2,688,439

UNITED STATES PATENT OFFICE 2,688,439

DECIMAL POINT MECHANISM

Walter W. Landsiedel, Elmira, N. Y., assignor to Remington Rand Inc., New York, N. Y., a corporation of Delaware Application December 2, 1948, Serial No. 63,164

4 Claims. (Cl. 235—60.15)

This invention relates generally to computing machines of the ten key type, and more particularly to a printing calculating machine upon which problems in multiplication and division may be performed and which prints upon a record sheet all the essential factors of such problems.

The machine of the present invention is an improvement upon the machine disclosed in Patent Nos. 2,237,881 and 2,255,622, issued April 8, 1941, and September 9, 1941, respectively. The aforementioned patents relate back to earlier Patent Nos. 2,203,336 and 2,229,980, issued June 4, 1940, and January 28, 1941, respectively. In these patents, various mechanisms for effecting multiplication and division are disclosed, whereas the present application discloses new and improved mechanisms to provide more efficient operation of the machine.

Multiplication is accomplished in the prior patents and also in the present invention, by a process of automatically repeated addition, effected through a single accumulator. Upon clearing the accumulator, the multiplicand is set up on a ten-keyboard which controls a group of shiftable stop pins carried on a travelling pin carriage. Successive depression of any of the keys sets down their respective stop pins in consecutive denominational columns of the travelling pin carriage. After the multiplicand has been entered on the keyboard, a number of ciphers (which is one less than the number of digits in the multiplier) is added to it. As an example, if the multiplicand were 357 and the multipler 207, then the multiplicand would be set up as 35700. A "multiply lever" is then pushed rearward (thereby cycling the machine) and held rearward for the proper number of cycles as indicated by the initial digit of the multiplier. The multiply lever is then restored to its original position. Automatic printing of the first digit of the multiplier and also of the entire multiplicand then takes place by the actuation caused by the multiply lever restoring movement. Visual counting of the machine cycles is effected through a dial at the upper right-hand side of the machine. These cycles consist of add and non-print cycles, the results of which are printed on a paper tape. This operation is effected upon the return stroke of the multiply lever. Each digit of the multiplier is factored in this manner (with the exception of ciphers). At the completion of the problem, the machine automatically totals to provide the desired product and the accumulator is automatically cleared.

In order to perform multiplication, the machine disclosed in the above mentioned Patent No. 2,237,881, required an additional operation which consisted in the latching of a repeat key. Furthermore, in order to effect a printing operation during multiplication, an additional stroke was necessitated and this consists in bringing the multiply lever to its extreme front position after it was once returned to its central or neutral position. This extra stroke which was formerly required to effect printing during multiplication operations has now been eliminated, since by merely releasing the multiply lever after a cycling operation, printing in the resultant operation takes place automatically. The printed factor, as explained in the previously mentioned Patent No. 2,237,881, visibly shows the operator that the multiplicand has been multiplied the correct number of times.

Division is accomplished in the present application in a manner similar to that of the previous patents. It is effected through a process of subtracting a smaller number from a larger one and counting the number of times the smaller number may be taken from, or "goes into" the larger number. Consequently, when putting a divisor under a dividend, the divisor is spaced over with ciphers, to the position where it could be taken from, or "goes into" the figure to the left of the dividend, at least once, but not more than nine times. In order to solve a problem in division, the dividend is initially entered on the keyboard and the motor key is depressed. This registers the dividend figure into the accumulator, revolving the accumulator wheels of various columns into a position representative of the digits in the dividend, as well as printing the amount on a paper tape. The divisor is then set up on the keyboard and the appropriate number of ciphers is added for placing the first digit of the divisor under the first digit of the dividend. Instead of depressing the motor key at this time, which would add the amount of the divisor into the dividend already entered in the accumulator, the divisor is left in the movable stop pin carriage and the division lever is pushed manually. This automatically conditions the machine for subtraction and suppresses the printing mechanism, so that the divisor (the significant digit of which is directly beneath the highest digit of the dividend) may now be successively subtracted from the dividend until it reaches one over-subtracted cycle. This condition automatically suspends the subtracting cycles and on the succeeding cycle, the divisor is added back into the accumulator and printed.

Furthermore, the stop pin section automatically back-spaces one digital space in order to align it with the successively diminishing digital order of the quotient. The printing operation occurs only during the back-space cycle and a number, representing the number of subtract cycles which took place before the over-subtraction occurred, is printed in a vertical column to the left of the printed divisor. This number in reality becomes part of the quotient of the division problem. The machine continues to cycle and a new series of subtract cycles, similar to those described above, viz; subtracting, over-subtracting, back-spacing and printing, is effected until the dividend originally entered into the accumulator has been completely reduced and the remainder thereof, if any, has become smaller in value than the divisor. The machine, as disclosed in the previously mentioned Patent No. 2,237,881, then stops, and the remainder is printed by depressing the add-total bar twice. In the machine of the present application, however, the requirement of depressing the add-total bar is eliminated and the machine prints the remainder, if any, and automatically effects this operation before stopping.

In the machine of the present application, a two-speed electric motor drive has been substituted for the single speed electric motor drive disclosed previously in Patents No. 2,229,980 and No. 2,237,881. The primary purpose of this improvement is to supply a relatively faster cycling speed during the multiplication and division operations than is provided for in the addition and subtraction operations. The application also discloses a special control key capable of delivering sub-totals while the machine is conditioned for multiplication. Heretofore, it was possible to obtain a sub-total by the depression of a sub-total key only during addition and subtraction operations.

Pre-set decimal mechanism for locating and then marking the decimal point in the quotient of a division problem is disclosed in the present application. Upon the completion of the division problem, and by simply depressing a special decimal key, the decimal point will be marked off in the proper place in the quotient. In the machine of my previous patent, only a semi-automatic means for locating but not printing the decimal point was disclosed.

The present invention further improves upon the previous division mechanism, as disclosed in the aforementioned patents, by the addition of an automatic stop mechanism, which will automatically shut off the machine if the division key is tripped with no factors entered in the machine. Other features of novelty and improvement will be given in the detailed description to follow.

The principal object of the present invention is to improve the general structure of a calculating machine of the type described in the above mentioned patents so as to increase the operating efficiency of the machine, and to simplify the various operations.

Another object of this invention is to more easily and accurately pre-fix the decimal point location during division operations, and to print the decimal point in accordance with said pre-fixed location.

Other objects and structural details of the invention will be apparent from the following description, when read in connection with the accompanying drawings, wherein.

*General description*

Because the present invention is in the form of a comprehensive improvement upon a printing calculator, the original features of which are already well known in the art of calculating machines, a brief description therefore, of the fundamental mechanical features of construction and operation will serve to introduce the invention. For a more detailed description of these features, reference should be made to the afoementioned patents: No. 2,255,622, No. 2,237,881, No. 2,299,980, and No. 2,203,336.

The machine in which the present invention is embodied is of the ten-key, key set, motor driven type which has a reversible accumulator and which contains a movable stop carriage; also a set of slide racks controlled by the stop carriage for entering numerical values into the accumulator. The accumulator is settable for either subtraction or addition. Multiplication in the present machine, as in its predecessors, is in effect, a series of repeated additions, while division is a series of repeated subtractions.

Figure 1:
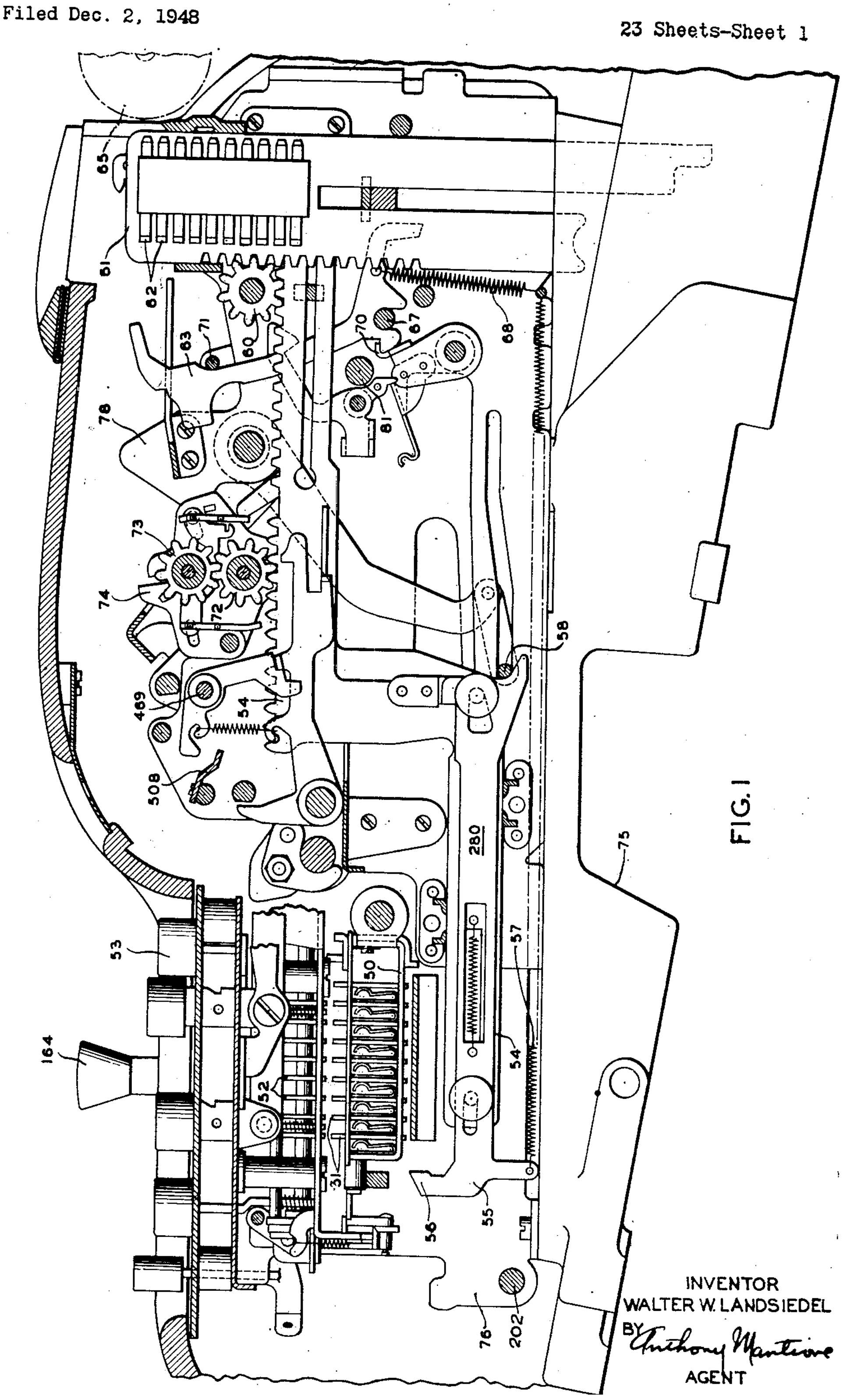
Fig. 1 is a view in right-hand cross section of the machine in disclosing the general features thereof.

In the type of printing calculating machine illustrated in Fig. 1, which is a view in cross section taken from the right-hand side of the machine, there are shown several basic features of the machine, including the keyboard, accumulator, travelling pin carriage, mechanism for actuating the accumulator, and the printing mechanism. The travelling pin carriage is represented by the reference character 50 and there is mounted thereon a plurality of rows of stop pins 51 adapted for depression under the stems 52 of the digit keys 53. The key stems 52 are individually positioned in such a manner that their lower extremities terminate directly over a column of stop pins 51, the pin carriage 50 normally taking the position that will place its extreme left-hand or highest order column beneath the stems 52. The carriage 50 is spring tensioned towards the left and suitable escapement mechanism (not shown) is provided, so that the carriage may shift one step in a leftward direction after each depression of any digit key 53, to thereby position a new column of stop pins 51 beneath the key stems 52. Located directly beneath the pin carriage 50 is a group of actuating racks 54, each rack of which is connected by means of a pin and slot to an associated slide 55 formed with an upturned toe 56. The racks 54 and slide 55 are normally held in their forward positions against the tension of a spring 57 by means of the bail rod 58. Once during each cycle of the machine, the bail rod 58 is moved rearwardly, thereby permitting the actuating racks 54 to travel rearwardly in the machine. The racks 54 are formed with a series of teeth along their upper edges for actuation of the accumulator wheels and for rotating a set of pinions 60. The pinions 60 engage the printing racks 61, in addition to the actuating racks 54. The printing racks 61 travel vertically a distance corresponding to the horizontal movement of the actuating racks 54. Each printing rack 61 carries a series of type 62 representing the digits 0–9 inclusive. These type are adapted to be struck by a hammer 63. A paper record tape (not shown) carried by a platen 65 is interposed between an inked ribbon (not shown) and the type elements 62. The hammers 63 are pivoted on a tie rod 67 and are urged rearwardly by the springs 68. The hammers 63 are normally latched against rearward motion by a latch 70 and are released once during a portion of each machine cycle to effect printing. They are then returned to their normal latched position against the tension of the springs 68 by the hammer restoring bail rod 71.

*Accumulator*

The accumulator of the present invention is identical to that of the accumulator disclosed in the above Patent No. 2,237,881. Still referring to Fig. 1, there are shown two sets of intermeshing wheels 72 and 73 rotatably carried by a pair of plates 74 (one illustrated only). The plates 74 provide a rotatable cradle for the accumulator wheels 72 and 73 which cradle is adapted to be elevated and lowered to disengage and engage the accumulator wheels and the actuating racks 54. In addition, the cradle is rockable a distance of 180°, thereby enabling the engagement of either the one or the other set of accumulator wheels with their associated racks, depending upon whether addition or subtraction is to be effected. Multiplication, being a series of addition operations, would require the rockable cradle to position the positive set of accumulator wheels into engagement with the actuator racks 54, thereby conditioning the machine for a series of adding operations. Division, on the other hand, being a series of subtract operations, would require the accumulator wheels to be swung into a negative position, i. e.; given a rotation of 180° from the add position. The wheels 72 are referred to as add wheels, inasmuch as they mesh with the racks 54 during add cycles while the wheels 73 are referred to as subtract wheels, inasmuch as they engage the racks 54 during the subtract cycles. Normally the wheels 72 and 73 engage the racks 54 and move to their disengaged position at the start of each accumulating cycle. Approximately, during the middle of the cycle, but prior to the return movement of the actuator racks 54, the accumulator wheels 72 and 73 are lowered and reengage the racks 54 as they return forwardly to their normal position. The return motion of the racks 54 causes the wheels in engagement therewith to revolve a number of digital tooth spaces, relatively determined by the extent of movement of their respective actuator racks. In direct contrast thereof, the accumulator wheels 72 and 73, during total-taking cycles, remain in engagement with the racks in the initial portion of the cycle, thereby positioning the printing racks 61 in a vertical position relative to the digital position of the accumulator wheels.

*Accumulator control mechanism*

The accumulator control mechanism for raising and lowering the accumulator wheels 72 and 73 from and into engagement with their actuating racks 54 is similar to that disclosed in the previously mentioned Patent No. 2,203,336. As further disclosed therein, the mechanism provides means for rotating the plates 74 to position either the wheels 72 or the wheels 73 into engagement with the racks 54, depending upon whether the amount to be entered is positive or negative. Totaling is performed on the machine by cycling the machine twice in succession with no entry set up on the keyboard. Mechanism for the accumulator control is not shown herein but may be found in the above mentioned patent.

*Framing and drive*

As illustrated in Fig. 1, the entire mechanism of the machine is mounted upon a base plate 75. It is further supported by the outer side frames 76 and 77 (Fig. 4) and also the inner frames 78 and 80. The main operating shaft 81 is supported between side frames 76 and 77. This shaft is rotated with a reciprocal rocking motion, once for each machine cycle, through means now to be described.

*Dual speed motor energizing mechanism*

Figures 7, 8:
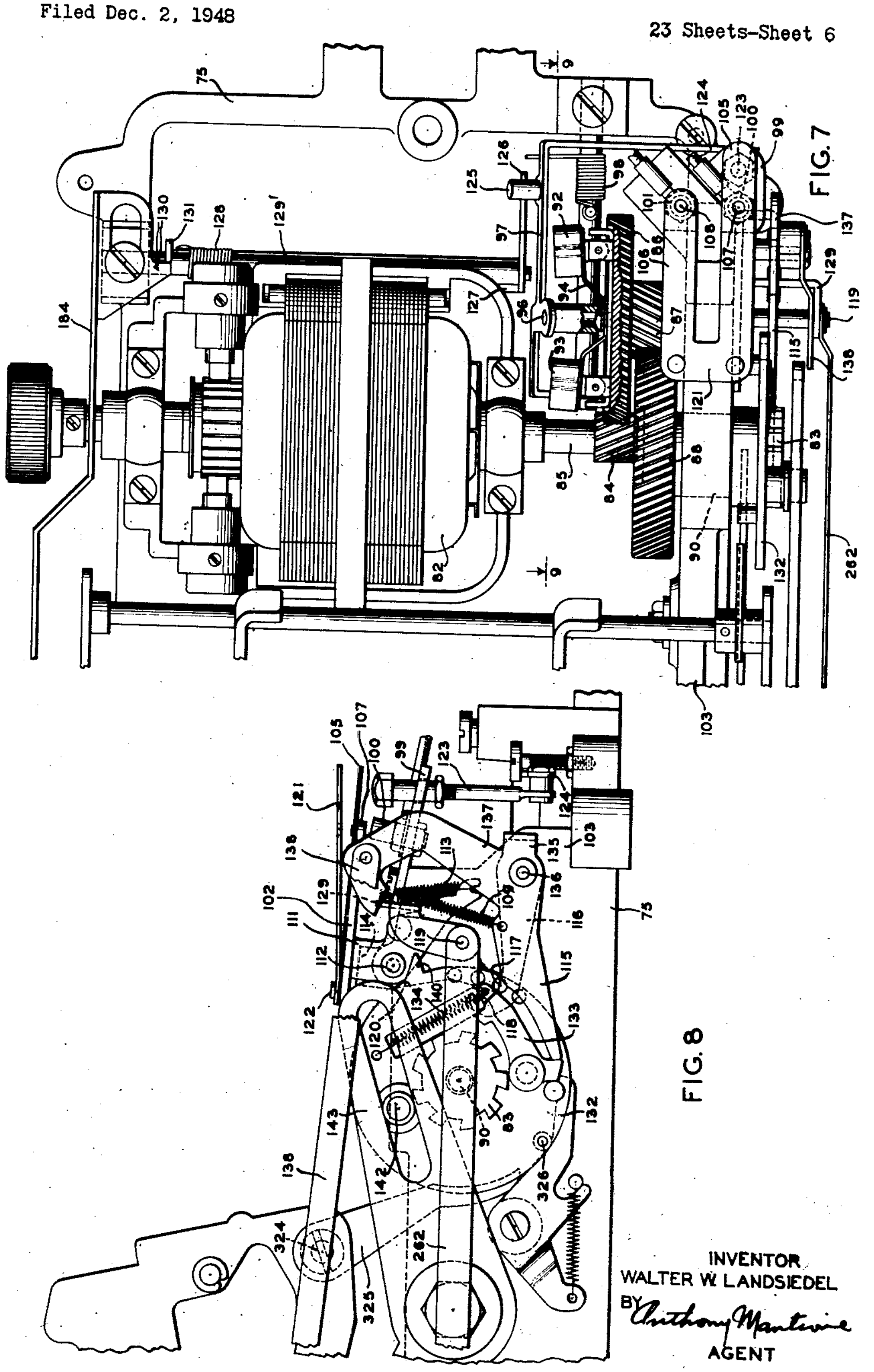
Fig. 7 is a detail plan view of the dual speed motor drive.
Fig. 8 is a right-hand side elevational view of the dual speed motor drive.

Referring now to the motor drive and especially to Figs. 7 and 8, an electric motor 82 is secured to the base plate 75 in a position to drive a ratchet 83 (which is an element of a one-revolution clutch) through speed reduction gearing. This gearing comprises a fixed pinion 84 on the armature shaft 85, which meshes with a gear 86 fast with a pinion 87. The pinion 87 further meshes with a gear 88 securely fastened on a shaft 90 on which said driven member or ratchet disc 83 is secured.

Figure 9:
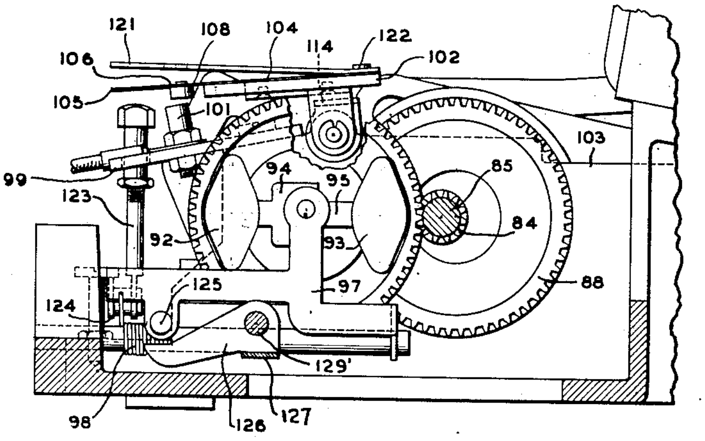
Fig. 9 is a cross-sectional side view of the governor and motor contacts, taken on a line 9—9 of Fig. 7 and showing the parts in position for low speed operation.
Figure 10:
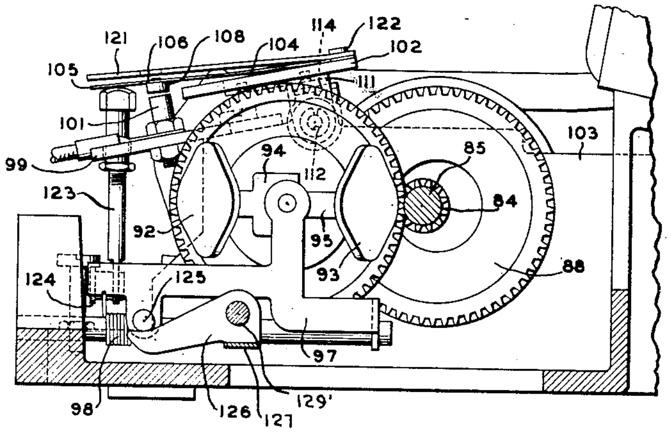
Fig. 10 is a view similar to Fig. 9 but showing the parts in position for high speed operation.

Considering now the means for controlling the speed of the electric motor 82 at either of two distinct speeds in order to drive the ratchet disc 83 at a relatively fast rate for multiplication and division, and at a substantially slower rate for addition and subtraction. It has been necessary to employ a relatively slower speed for the addition and subtraction operations because the adding and printing racks require additional time to get settled after rebounding whenever the accumulator wheels are thrown into mesh. Division and multiplication, on the other hand, contain several non-add and non-print operations which permit higher rates of cycling speeds. In order to provide dual rates of operating speed of the electric motor 82, there is attached to the gear 86 a governor comprising two swingable fly weights 92 and 93 which are adapted, upon attaining a predetermined rate of rotation, and through a pair of pivotally mounted links 94 and 95 (see also Figs. 9 and 10) to urge a stud 96 outwardly from the gear 86. The stud 96 is securely fastened to a rockable bail member 97. The bail member 97 is normally urged in an anti-clockwise direction by a spring 98, thereby retaining the flyweights 92 and 93 in their contracted position. Current for energizing the electric motor is controlled by two fixed contacts 100 and 101. These contacts, connecting with leads, as shown in Figs. 8 and 9, are mounted on an insulating support 99 secured to the top of the base wall 103. As will be hereinafter described novel means are herein provided for connecting the contacts 100 and 101 with a metallic conductor 104 at the proper time. This conductor 104 has the general J-shape, shown in Fig. 7, one arm 105 of which is substantially longer than the opposite arm 106. The conductor 104 carries on its resilient arms a pair of contacts 107 and 108 for cooperating with the contacts 100 and 101 respectively.

Figure 3:
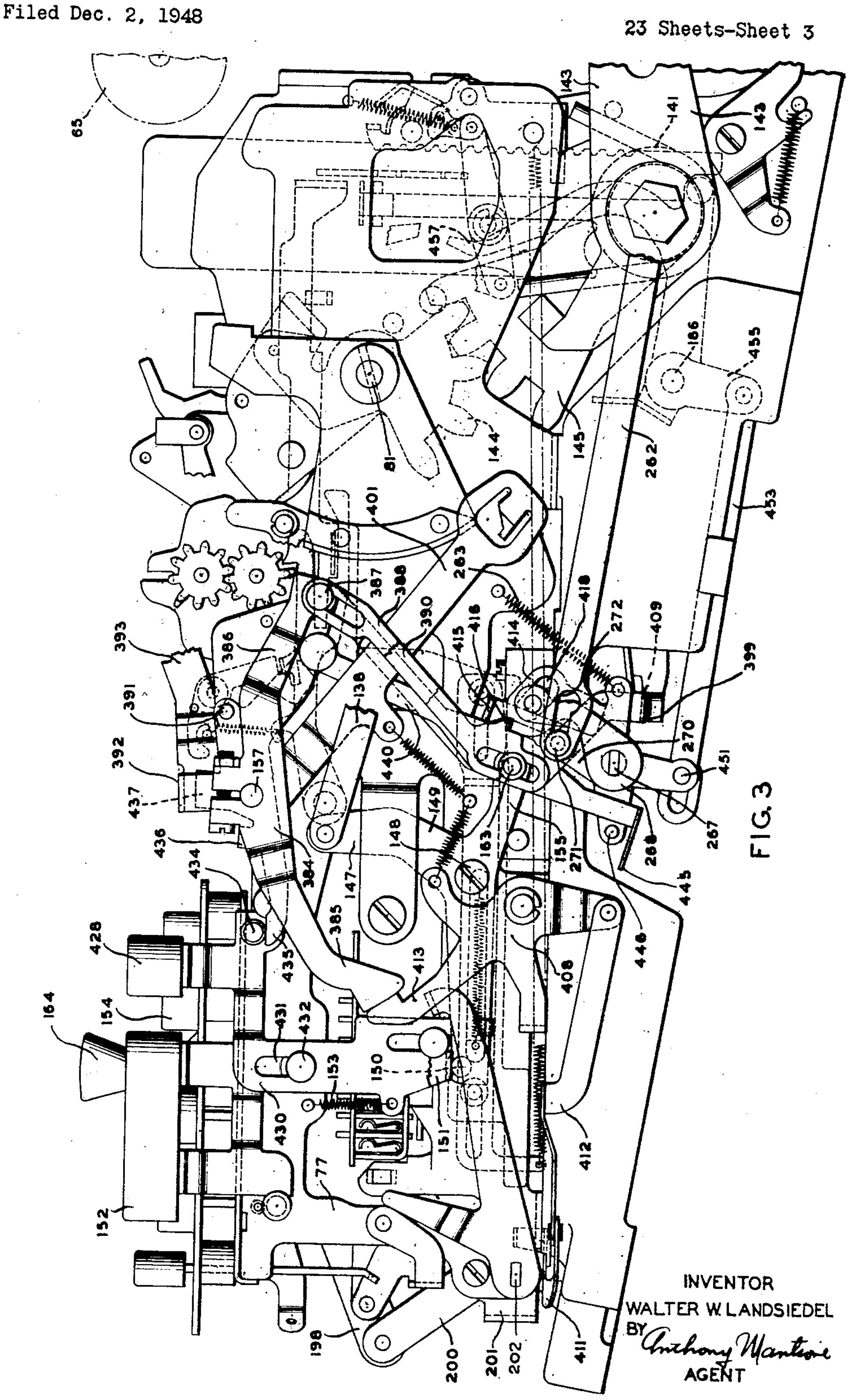
Fig. 3 is a view in right-hand elevation disclosing the general operating mechanism of the machine.

Referring now to Fig. 8, the conductor 104 is riveted to a portion of insulating material 102 which is secured to the horizontal cross bar of a bail shaped contact lever 111 which straddles the base wall 103 and is pivotally mounted on a stud 112. The bail lever 111 is normally urged counter-clockwise, as shown in Fig. 8, by a spring 113. Also straddling the wall 103 and pivoted on stud 112 is a further bail member 114 positioned beneath the upper bail lever 111. The bail member 114 is formed with a depending arm 120 which cooperates with an arm 116, to be hereinafter described. A control arm 115 is the right-hand branch of a bail, the left-hand branch of which is the above mentioned arm 116. The arm 116 is formed with two stepped shoulders 117 and 118. The depending arm 120 is normally positioned against the lower step or shoulder 117, the purpose of which is to maintain a separation between the contacts 107, 100 and 108, 101. A spring 109 serves to draw the arms 115 and 116 clockwise as seen in Fig. 8, thereby serving to retain the depending arm 120 upon the lower step 117 during the normal position. When the control arm 115 is tripped by the forward motion of a link 138, as shown in Fig. 8, arm 116 is also swung downward. A stud 119, fixedly secured to the depending arm 120 of the bail member 114 serves as a pivotal connection for the terminal end of the feature key latch release link 262 (Fig. 3).

Figure 27:
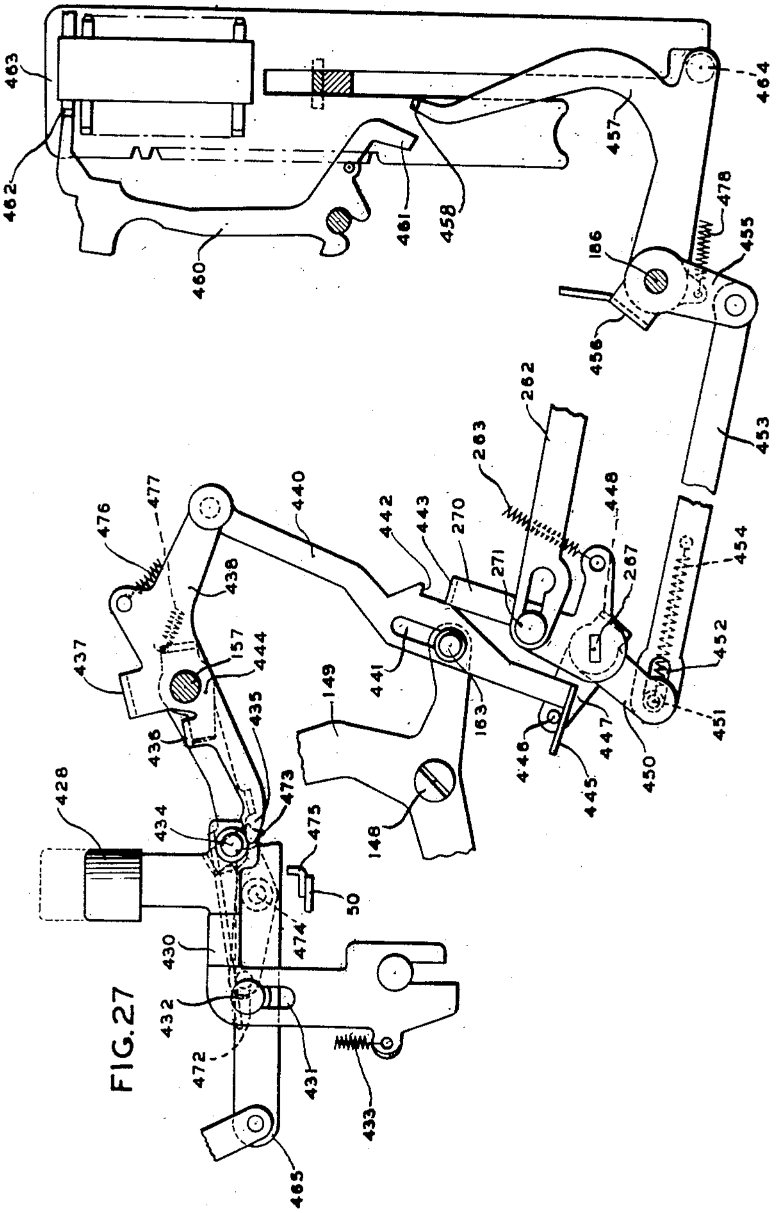
Fig. 27 is a view similar to Fig. 25, but with the decimal key depressed.

The link 262 is normally under tension of a spring 263, which draws the latch lever 270 counter-clockwise (Fig. 27). The fixed stud 271 on the latch lever 270 will then cause the link 262 to be urged forwardly to rock the depending arm 120 in a clockwise direction (Fig. 8) unless it is limited by the lower step 117 of the arm 116. When the arm 116 is swung downward through forward tripping of the link 138, the arm 116 will swing counter-clockwise and thereby permit arm 120 to escape clockwise under tension of the spring drawn link 262. Thus, the arm 120 swings forward from step 117 to step 118. The bail 114 which carries the depending arm 120 is also formed with an additional bail portion 129 which projects outwardly from the depending arm 120 and overlies the depending arm of the bail member 111. When the arm 120 is permitted to revolve one step clockwise from the shoulder 117 to the shoulder 118, its projecting bail portion 129 will urge the depending arm of the bail 111 also in a clockwise direction. Positioned above the resilient J-shaped conductor 104 is a rigid metallic member 121 of identical conformation. The rigid member 121 is secured to the top of the bail member 111 by the rivets 122, and is separated slightly from the underlying flexible conductor 104 at its outermost end. This rigid member makes, however, a secure contact at its fixed end and its main purpose is to impart rigidity to the flexible underlying conductor 104. A clockwise rotation of the bail member 111, through tension of the link 262 and by means of bail 129, will swing the rigid member 121 forward and thereby urge the flexible J-shaped conductor 104 into contact with the contacts 100 and 101. Beneath the projecting extremity of the flexible arm 105 (Figs. 8, 9 and 10) of the resilient J-shaped member 104 there is positioned a reciprocating pusher rod 123. The upper terminus of this rod can be dropped exactly to the level of the lower flexible arm 105 when the arm 105 is in contact with its cooperating contact terminal 100. A slight vertical rise of the pusher rod 123 will then cause a separation of the contacts 100 and 107, thereby to open the motor circuit. The lower extremity of the pusher rod 123 is pivotally secured to an arm 124 of the rockable bail member 97.

A short stud 125 (Figs. 7, 9 and 10) projects from the face of bail 97 and is moved downward therewith as the bail is moved downwardly by the action of the fly weights 92, 93. An arm 126 is disposed below the stud 125. This arm 126 is fixed to the end of a bail 127 which is pivoted to a fixed shaft 129′ (Fig. 7). A loading spring 128 is coiled around the shaft 129′ and has one end fixed to the shaft 129′ and the other pressing against bail 127 and normally tending to urge the arm 126 upward into contact with stud 125. The end of the bail 127 opposite the arm 126 is provided with a finger 131 which extends upwardly and lies in the path of an ear 130 on the flat rear end of the link 184. This link is moved either by the multiply lever 164 or by the division lever 372. When these levers are not operated the link 184 is disposed with its flat end in the rearmost position as shown in Fig. 7. In this position, the ear 130 presses the finger 131 against the resistance of spring 128 and moves the arm 126 to its lowermost position out of contact with the stud 125.

With this position of the parts, and with the multiply lever or division lever not operated, the operation of any other key to start the motor will close the contacts of the motor and cause it to start and revolve the flyweights which will tend to turn the bail 97 against the resistance of spring 98. Depending upon the resistance of this spring, the bail will be moved, at a certain speed of the motor, to raise rod 123 and open the motor circuit. The motor will then slow down thus allowing the spring 98 to force the bail 97 back to normal and close the contacts of the motor. Therefore it will be clear that under these conditions the motor can never exceed a predetermined speed before its contacts are opened. This action is a repetitious one to keep the motor speed down below a definite amount for ordinary operations, except such as multiplication and division operations.

However, when these latter operations are to be brought into play, the multiply lever 164 or the division lever 372 is operated and moves the link 184 forwardly. This action removes the ear 130 from the finger 131 whereby the full strength of the spring 128 is exerted on bail 127 to move the arm 126 upwardly into contact with the stud 125. This contact thus will add the resistance of the spring 128 to the already established resistance of the spring 98 to the downward movement of the bail 97 so that it will allow the motor to achieve a higher speed before the flyweights can overcome the resistances of the two springs and thus force the bail 97 down enough to open the motor contacts and slow it up. The motor being of the high speed universal type will accelerate rapidly once its contacts are closed. By opening its contacts earlier its speed is reduced and by retarding the opening of its contacts the motor speed will rise. Thus the resistance of one spring 98 is sufficient to insure the earlier opening of the motor contacts whereas the added load of the spring 128 will insure a later opening of the contacts so that the motor can reach a higher speed. Therefore for ordinary operations a slow motor speed is achieved and for multiplication and division a higher speed is achieved.

*Clutch mechanism*

Figure 4:
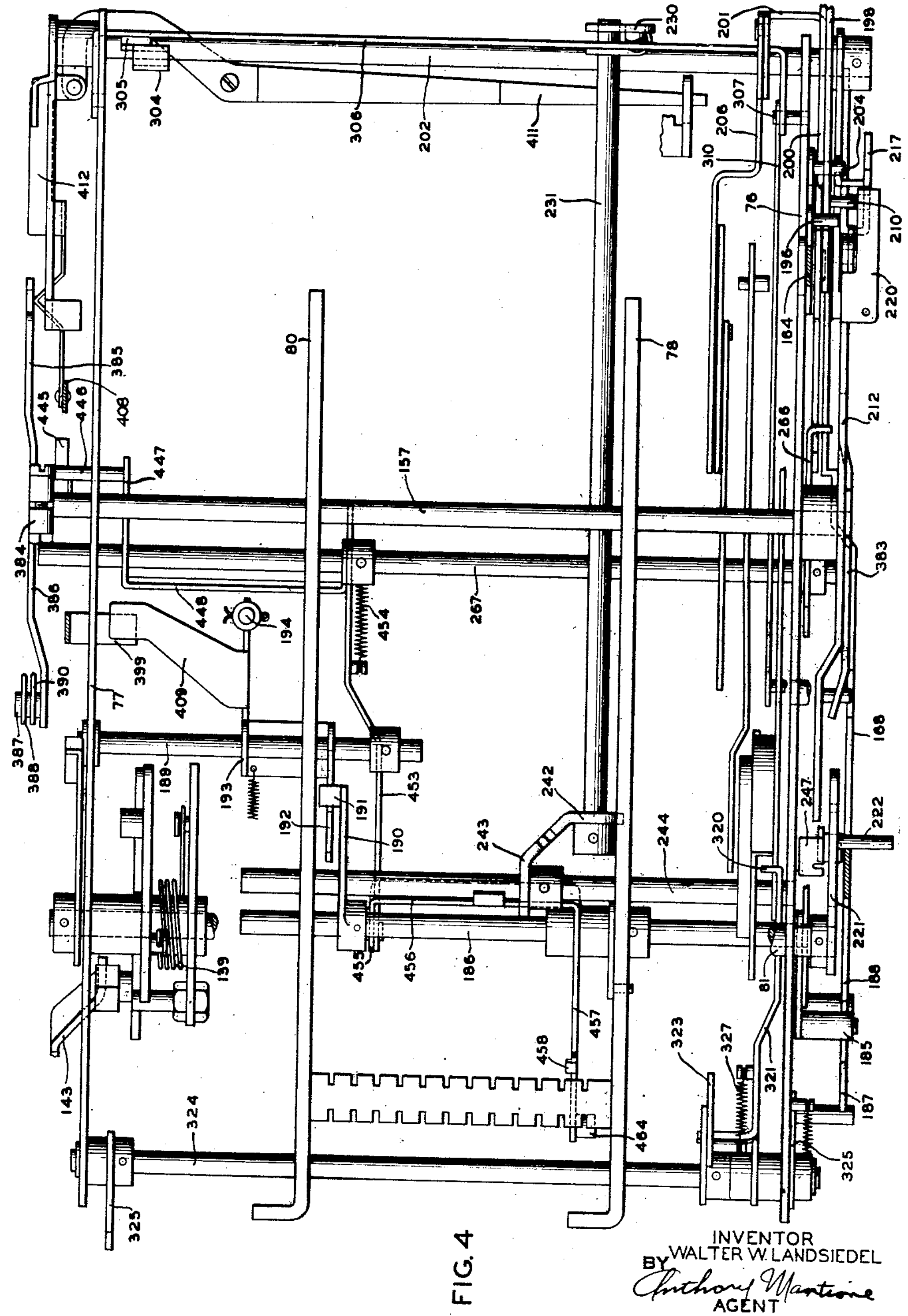
Fig. 4 is a plan view of the machine framework showing the relative arrangement of the various features of the invention.

The one-revolution clutch for driving the main shaft of the present machine is similar in operation to that of the clutch mechanism disclosed in the previously mentioned Patent No. 2,237,881. Loosely mounted upon the shaft 90 (Figs. 7 and 8), and inwardly adjacent the ratchet disc 83, is a plate 132 upon which is pivoted a pawl 133 cooperable with the ratchet disc 83. A spring 134 tensioned between the plate 132 and the pawl 133 urges the pawl in a counter-clockwise direction (Fig. 8) into engagement with the ratchet disc 83. Normally, however, the pawl 133 is held in the disengaged position shown in Fig. 8 by the arm 115 of the three-armed bail lever 135 which is pivoted on a stud 136 to the wall 103. The second arm 116 of the bail lever 135 extends forwardly and as previously described, is formed with a pair of shouldered steps at its forward end adapted to engage the toe of the dependent branch of the bail 114. Inasmuch as this lever is urged through its spring 109 in a clockwise direction, its toe nevertheless limits on the bottom step 117 of the arm 116 when the machine is normally at rest. It will be further seen that the three-armed bail lever 135 is formed with a third upstanding arm 137, which is pivotally connected to the forwardly extending link 138. The link 138 is moved forward whenever it is desired to start the machine, to thereby rock the three-armed lever 135 in a counter-clockwise direction. As previously mentioned, the arm 115 of the three-armed lever 135 normally holds the pawl 133 disengaged as in Fig. 8, and it will be further seen that counter-clockwise movement of this three-armed lever, besides starting the motor to rotate the ratchet disc 83, will also permit the pawl 133, under tension of its spring 134, to engage the teeth of the ratchet disc 83. This will provide a positive locking engagement causing the plate 132, upon which the pawl is mounted, to rotate with the disc 83. The direction of movement of the plate 132 and the ratchet disc 83 is counter-clockwise as viewed in Fig. 8, in order that the plate will be disengaged from the ratchet disc upon the restoration of the arm 115 to normal position, since the forward end of the arm 115 will then reengage the pawl 133. The plate 132 is formed with a cam nose 140 on its outer periphery; the cam nose 140 being adapted to cooperate with the stud 119 which is fixedly carried by the bail lever 114. In the normal position of the machine as viewed in Fig. 8 the stud 119 is positioned just below and to the right of the cam nose 140 and, as the lever 114 moves clockwise to start the machine, the stud 19 moves forwardly to a location directly beneath the cam nose 140. Now, near the end of the revolution of plate 132, the nose 140 will deflect the stud 119 and, as a consequence, the lever 114 will be rocked rearwardly in a counter-clockwise direction to break the motor circuit and release arm 116 so that the entire three-armed bail lever 135, comprising arms 115, 116 and 137, will be forced to return to normal under tension of spring 109. On the other hand, if the previously mentioned link 138 is held in its forward operating position for more than one revolution, the three-armed lever 135 will be prevented from returning to its normal position and a continuous and uninterrupted series of operating cycles will be effected. The rotary movement of the drive plate 132 is utilized to effect an alternating rocking motion of the main operating shaft 81 in a manner differing somewhat structurally from that disclosed in my Patent No. 2,237,881. Referring to Figs. 4 and 8, there is disclosed a roller stud 142 secured to the drive plate 132 and slidable within a slot in one arm of a pivoted crank lever 143. The short forward portion (Fig. 3) of the crank lever 143 cooperates with a square stud fixed to a sector arm 145. The arm 145 is pivotally mounted at one end and its toothed portion engages a toothed segment forming part of a lever arm 144 fast to the main shaft 81. When the drive plate 132 begins to revolve (counter-clockwise as viewed in Fig. 8) it will rock the rear arm of lever 143 downwardly, thereby raising the shorter front portion as seen in Fig. 3. This will rock the sector arm 145, clockwise, to in turn rock a sector arm 144 counter-clockwise. Since the arm 144 is fast to the main shaft 81, it will cause the main shaft 81 to be rocked counter-clockwise. When the drive plate 132 completes the second half of its complete revolution, its roller stud 142 will rock the crank lever 143 counter-clockwise, thereby lowering the shorter front portion of the lever 143. A heavy coiled spring 139 (Fig. 4) is provided to return the toothed arm 144 and the main shaft to normal position.

It will also be seen in Fig. 3 that the forward end of the link 138 is connected to an upstanding arm 147 of the triple-armed bell-crank lever 149 which is rotatably secured by the stud 148 to the side frame 77. A second and normally horizontally positioned arm of the triple-armed bell-crank lever 149 extends forwardly and carries a stud 150 at its forward end. Overlying the stud 150 is the stem 151 of the usual motor key or add-total bar 152 which is slidably mounted on the side wall 77 for vertical depression. The add-total bar 152 is urged upward to the position shown in Fig. 3 by a spring (not shown) which is positioned immediately behind the decimal key spring 153. When the add-total bar is manually depressed it will rock the bell-crank lever 149 in a counter-clockwise direction (Fig. 3) to pull the link 138 forward and start the motor. It is obvious, therefore, that any operation which rocks the triple-armed bell-crank lever 149 in a counter-clockwise direction will start the motor. Other and additional means are provided for operating the triple-armed bell-crank lever 149 as for example, the subtract key 154, which will be described later under "Improved subtraction control mechanism".

*Multiplication*

Considering first the multiply mechanism disclosed in the previously mentioned Patent No. 2,237,881, a multiply lever is provided and also a multiply-divide key. In order to perform multiplication, first the multiplicand was set up on the keyboard, plus sufficient ciphers to permit back-spacing for each digit of the multiplier. The multiply-divide key was then latched down to prevent restoration of the stop carriage after cycling. Then, for each digit of the multiplier, the multiply lever was pushed to its rear position, holding it for the number of cycles equivalent to the value of the digit. Printing of each digit of the multiplier was accomplished, after returning the multiply lever to its center position, by bringing it forward to its lowermost position for one stroke. This last operation set into motion the mechanism which printed the multiplier and back-spaced the multiplicand. In like manner, each digit of the multiplier was cycled and printed. Then the clearing lever, attached to the front part of the machine, was pushed to the right to clear the keyboard. A total was finally obtained by depressing the add-total bar twice and the result would be the product of the multiplication.

In the machine disclosed in my present application, multiplication is likewise accomplished by the pre-set method; i. e., by setting up a multiplicand on the keyboard. After entering the multiplicand, sufficient ciphers (as many as there are digits in the multiplier, less one) are added to the pre-set multicplicand to permit automatic back-spacing for each digit of the multiplier. Multiplication is first effected with the highest order of the multiplier or the left-hand figure of the multiplier, reading from left to right, i. e., in the same sequence as that in which numbers are read or remembered. If the left-hand or highest columnar order of the multiplier is seven, then the multiply lever is moved to its rearward position on the keyboard and held for seven cycles of the mechanism. The figure seven will then appear, as in the prior Patent No. 2,237,881, on the counting dial. When released, the multiply lever returns to its center or neutral position, and in so doing, it actuates mechanism to print the multiplier (7) and also, to back-space the multiplicand automatically to the next multiplier position. Should the multiplier contain a cipher, the multiply lever is moved from its center or neutral position, as is disclosed in the above Patent No. 2,237,881, to the forward position, at the front of the machine, and held for one cycle. When the last digit of the multiplier is printed, the machine automatically completes the problem, prints the product and clears the machine. From the foregoing description, it will be clear that the machine disclosed in the present application does not require the depression of a repeat key to effect multiplication, nor does it require the actuation of the multiply lever for a forward stroke to effect printing and back-spacing of the multiplier.

*Multiply mechanism*

(Figs. 2, 12, 13, 14 15 and 16)

When the multiply lever 164, pivoted on the left outer side frame 76 by a stud 165, is pushed rearward for a cycling stroke, it will rock an arm 166 of the lever 164 so that a stud 167 will carry forward the dial rack raising slide 168, to which the stud is pivoted, while at the same time a roller 169 carried on the stud 167 will cam down an arm 170 of the motor drive control lever 171. The lever 171 will then be rocked counter-clockwise as viewed in Fig. 2, to operate the electric motor 82 through mechanism similar to that disclosed in the above Patent No. 2,237,881. As the dial rack raising slide 168 moves forward, the curved arm 172, which is part of the multiply lever 164, cams down the stud 174 on a rocker arm 175. The rocker arm 175 is revolvably mounted on the left outer side frame 76 by a stud 173. Pivotally attached to the upper end of the rocker arm 175 is a rearwardly extending link 176. This link is normally urged toward the rear of the machine by a spring 177 anchored to a stud on the side wall 76. The rearmost end of the link 176 is connected to the lower end of an arm 178 which forms a portion of a bail shaped lever 180, which is pivoted to the outer frame 76 by a stud 181, and also to the inner frame 78. Forming a part of this bail lever is a forwardly extending arm 182, normally positioned with its front end immediately below and to the rear of a hammer restoring bail rod 71 which lies in the path of the printing hammers 63 and serves, among other purposes, to restore the printing hammers after printing. Forward movement of the link 176, caused by rearward movement of the multiply lever 164 and the accompanying rocking of lever 175, will revolve the above mentioned bail lever 180 in a counter-clockwise direction, thereby placing the toe of the forwardly extending arm 182 in the path of the bail rod 71, and in this manner serving to prevent printing by blocking the hammers 63. Through this means, which is identical with that disclosed in the above Patent No. 2,237,881, printing is prevented whenever the multiply lever 164 is held in its rearward position for cycling.

The rearwardly extending link 176 serves still another function in that of controlling the motor speed as previously mentioned under the "Dual speed motor energizing mechanism." Downwardly depending from the tail of the rearwardly extending link 176 and pivotally fastened to the stud 183 thereon, is a slide member 184 cooperable through its latch 130 to regulate the energization of the electric motor 82 (Fig. 7). By means of this linkage, an increase in motor speed during multiplying operations can be effected simply through actuation of the multiply lever 164.

The main function of the machine during multiplication is that of adding the multiplicand into the accumulator once during each machine cycle. As previously mentioned, this was accomplished in the machine of the above Patent No. 2,237,881, by first setting up the multiplicand on the stop pin carriage and then latching down a repeat key to prevent automatic return of the carriage after each machine cycle. The mechanism now provided for eliminating the repeat key or so-called multiply key latching operating will presently be described.

Figure 11:
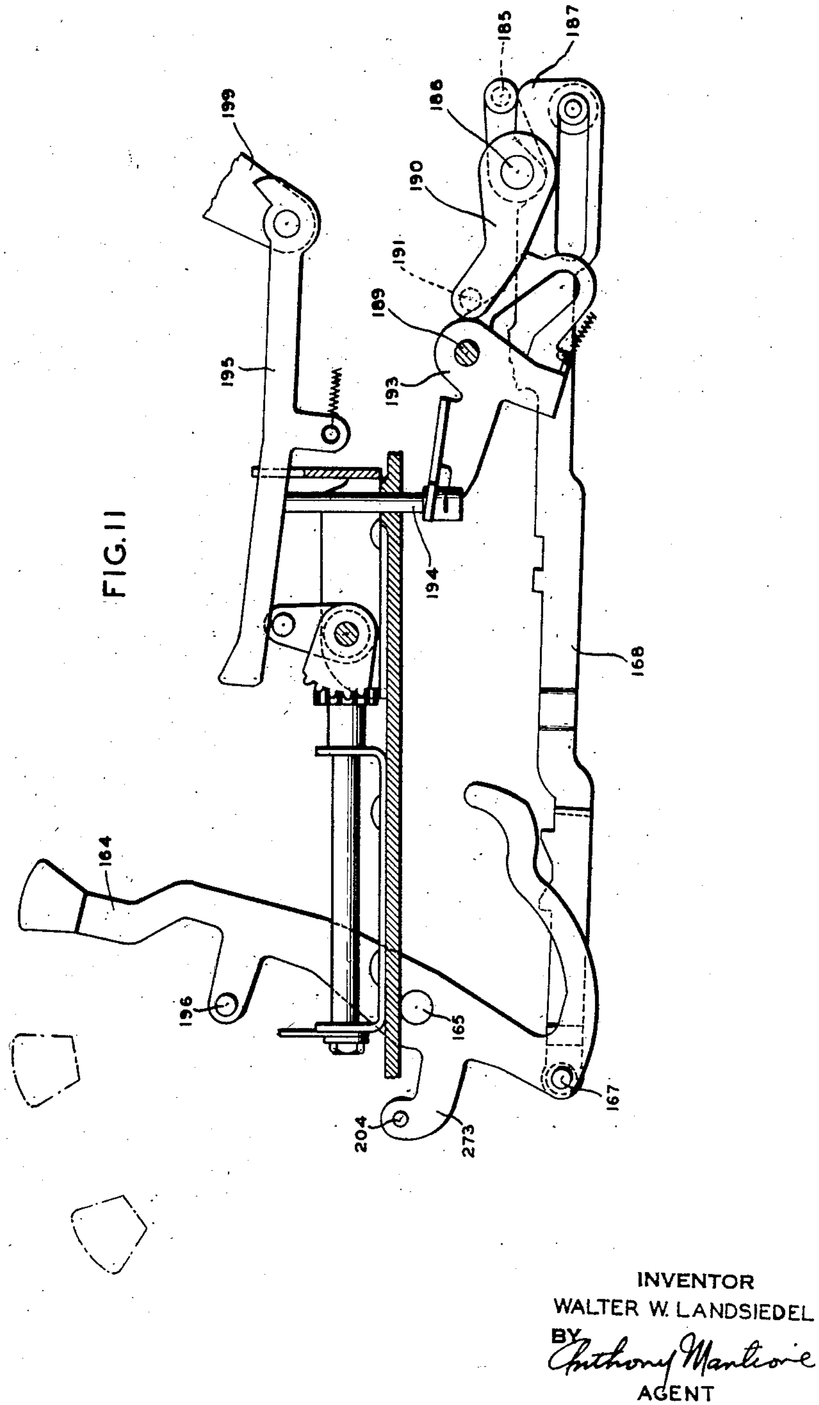
Fig. 11 is a detail view of mechanism disclosed for preventing restoration of the stop carriage during multiplication.

Referring to the dial rack raising slide 168 (Figs. 2 and 11) it will be seen that the extreme rear portion of the slide is provided with an upper edge having the form of a notch. It will also be apparent that any movement of the slide 168, caused by movement of the multiply lever 164, either forwardly or rearwardly, will raise a roller 185 out of the notch to rock the shaft 186 in a clockwise direction. When the slide 168 is brought forward, its highest edge 187 cams the roller 185 to prevent restoration of the stop carriage as illustrated in Fig. 11. As seen in the plan view, Fig. 4, the shaft 186 is mounted transversely beneath the machine. Adjacent the inner side of the right inner frame 80 and securely fastened to the shaft 186 is an arm 190 carrying a stud 191. As the arm 190 turns counter-clockwise as viewed in Fig. 11, the stud 191 is brought downwardly upon the upper sloping edge 192 of a bell-crank member 193. This will cause the bell-crank member 193, which is loosely pivoted on the fixed shaft 189, to elevate the slidable pin member 194. The last mentioned slidable pin member is positioned directly beneath a pivotally mounted link 195. The link 195 constitutes part of the stop carriage restoring mechanism and its operation from this point on is considered old in the art, Patent 2,237,881, wherein (Fig. 18) link 247 corresponds to link 195, and pin 248 corresponds to pin 194. As illustrated in Fig. 11, the operative positions of the multiply lever 164 are indicated in dotted outline.

*Automatic printing during multiplication*

Figure 2:
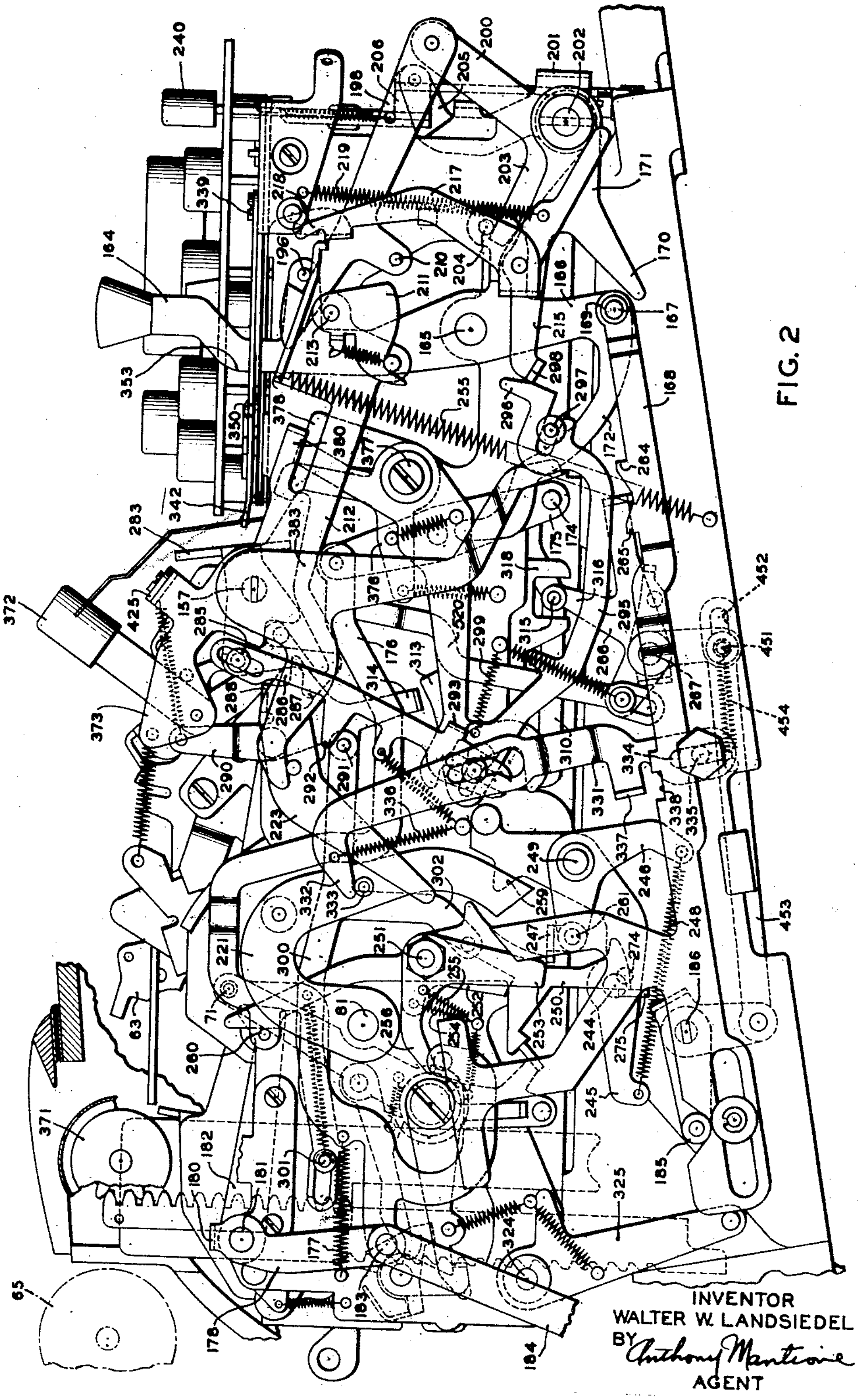
Fig. 2 is a view in left-hand elevation of the multiplication and division control mechanism in normal position.
Figure 32:
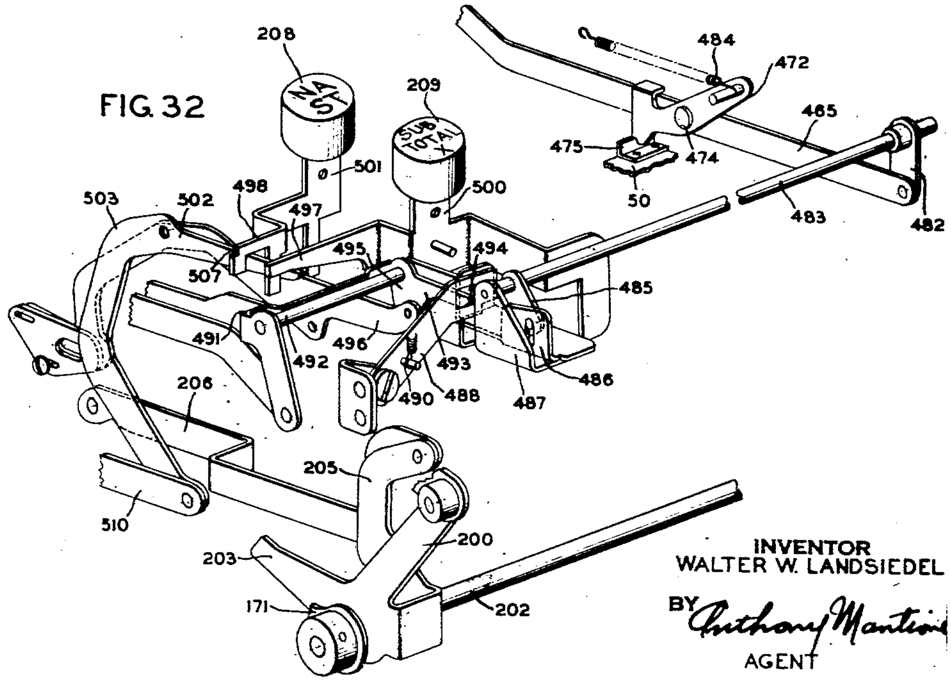
Fig. 32 is an isometric view disclosing details of the non-add and sub-total key construction.

When the multiplication lever 164 is pushed rearwardly for a cycling operation (Figs. 2 and 12) a stud 196 carried by the multiply lever 164 hooks in front of the shoulder 197 formed on an arm 198 and thereby draws the pivoted arm 198, otherwise known as the non-add pawl, forward from its normal position as seen in Fig. 2. By drawing the arm 198 forward it actuates non-add mechanism connected to an arm 200 (Figs. 4 and 32). The non-add mechanism of the present machine, with the exception of certain of its key control linkage, is similar to that shown in the above Patents No. 2,255,622 and No. 2,237,881, and is substantially the same mechanism that has long been used in this type of machine. Briefly, the fundamental purpose of the non-add mechanism is to prevent the accumulator wheels 72 (Fig. 2) from engaging their actuator racks at the usual time and to hold them out of mesh until the end of the cycle. This first cycle is always a non-add cycle because the last cycle in a multiplication operation is a print and add cycle, which would furnish one cycle too many if the entire group were added. Furthermore, the first non-add and non-print cycles are employed to condition the machine by setting the latches for the ensuing operations. Referring now to the plan view, Fig. 4, and also to Fig. 3, it will be seen that a bail shaped lever 201, of which the arm 200 forms a part, is loosely mounted on the motor operating shaft 202. By referring to Fig. 2, it will also be seen that the bail member 201 has an arm 203 underlying a stud 204 on the multiply lever 164. A forward movement of the multiply lever 164 will depress the arm 203 and, furthermore, lever 171 which is fixed to the motor operating shaft 202, to start the motor 82. This action on arm 203 will cause the bail lever 201 to revolve in a counter-clockwise direction. As shown in Figs. 2 and 4, the lever 201 is formed with an arm 205 on the inner side of the outer side wall 76. On the upper end of the arm 205 there is connected a rearwardly extending link 206 (Fig. 4), which is further connected to mechanism similar to that disclosed in Patent No. 2,237,881, (see link 225, Fig. 12) and is herein adapted in likewise manner for actuating the wipe pawl mechanism (not shown) in order to retain the accumulator wheels out of mesh with the accumulator racks during the rack restoring stroke of a non-add cycle.

Figure 12:
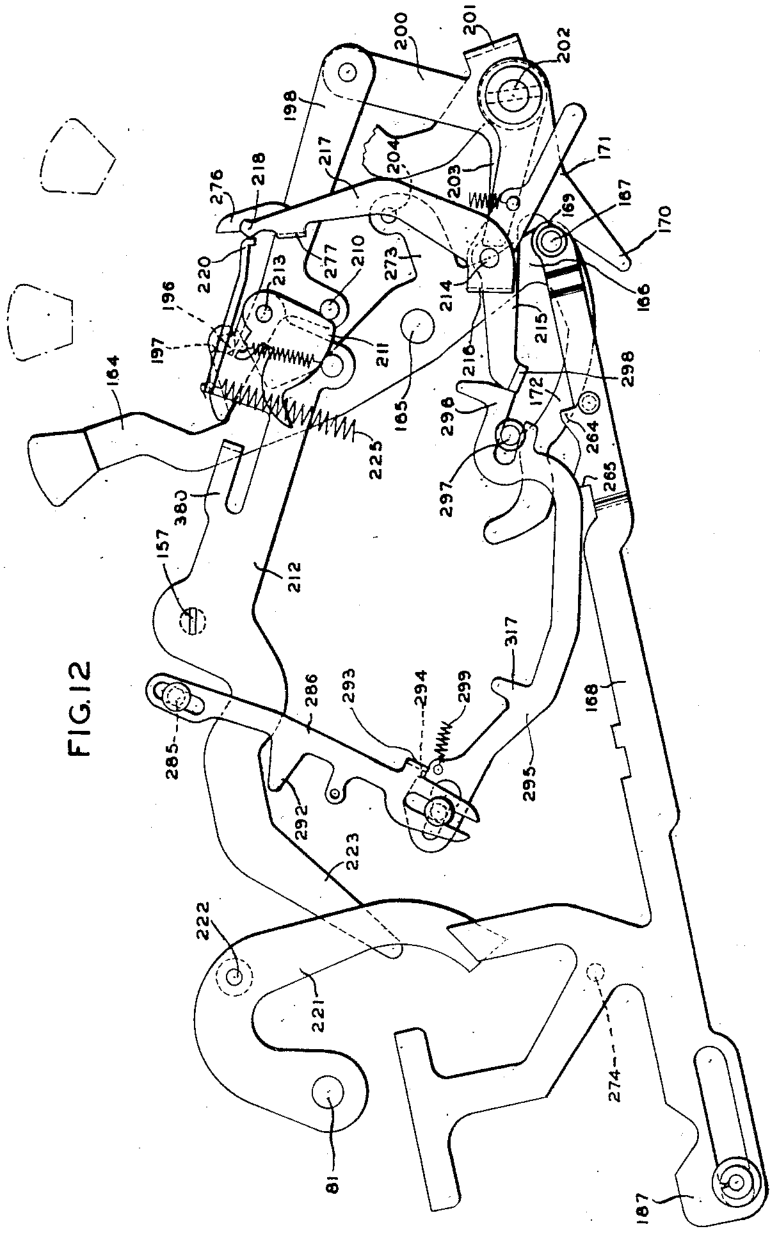
Fig. 12 is a detail left-hand side view of the multiplier automatic printing mechanism in operative position and with the multiply lever in its rear multiply position.
Figure 13:
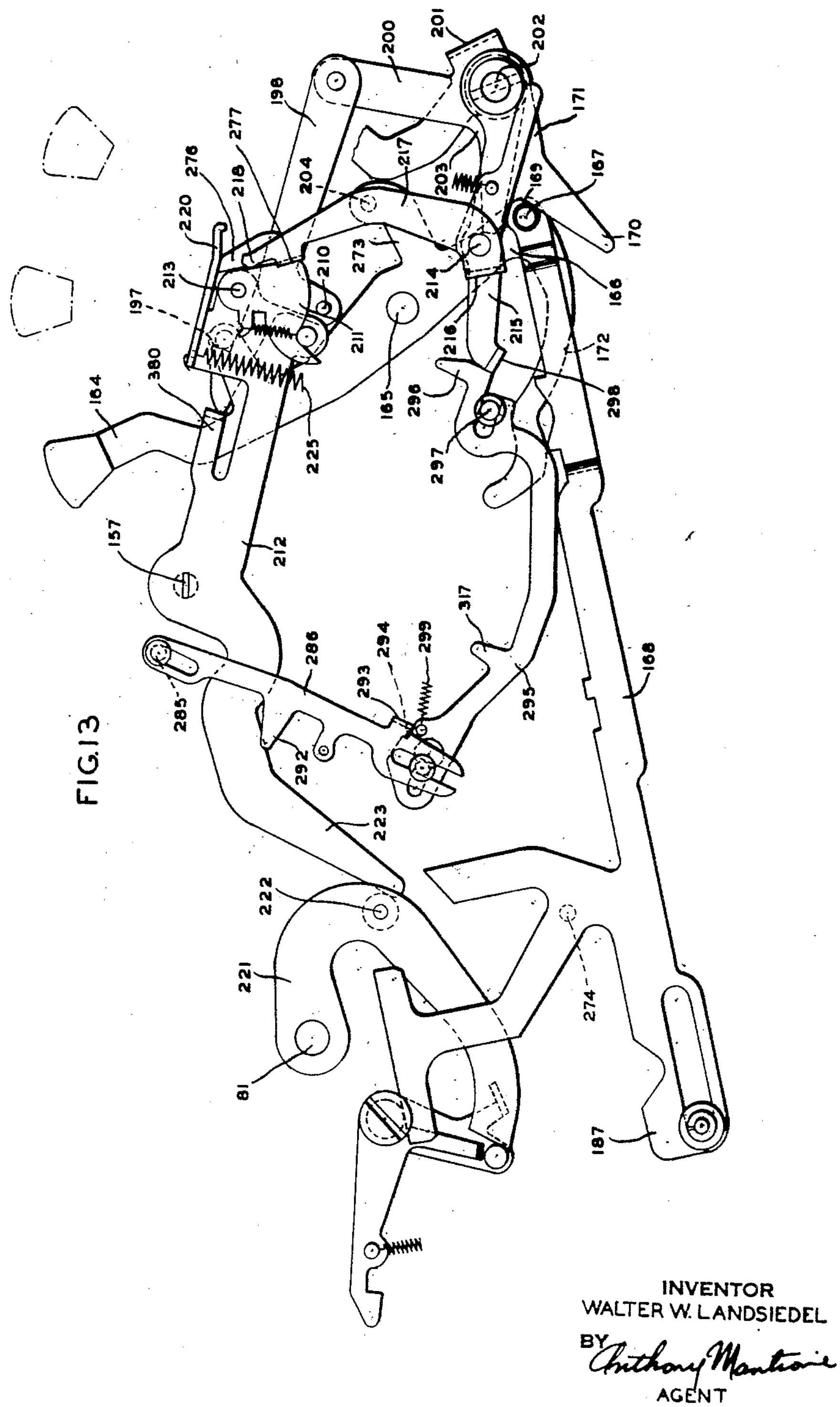
Fig. 13 is a left-hand side view of the mechanism of Fig. 12 after the main shaft has moved forward.

With further reference to Fig. 2 and also to Fig. 12, there is disclosed a fixed stud 210 carried by a depending arm of the non-add drive pawl 198, which stud is adaptable to contact a non-add pawl release plate 211. The stud 210 rotates clockwise the plate 211 which is swingably pivoted to a division shaft drive lever 212 by a stud 213. The stud 157 carried by the multiply lever 164 as previously stated simultaneously causes the lower arm 170 of the lever 171 to be depressed sufficiently to start the motor 82. A stud 214 fixedly mounted on the upper arm 215 of the lever 171 swingably carries a rockable bail member 216. An arm 217 of the bail member 216 is lowered when the lever 171 is rocked until a toe 218 of the arm 217 contacts a latch 220 of the division shaft drive arm 212. Since the electric motor 82 has now been energized by depression of the motor drive control lever 171, the main shaft 81 is now turned clockwise as viewed in Fig. 13, thereby revolving the back-space cam 221 which is securely fixed to the shaft 81. As the back-space cam 221 swings downward and rearwards, a stud 222 fixed securely thereon is effective to depress the rear arm 223 of the division shaft drive lever 212, thereby raising the forward portion of the lever 212, which lever is loosely fulcrumed on the subtraction shaft 157. As the forward portion of the lever 212 rises, the latch 220 will be lifted high enough to permit the toe 218 of the arm 217 to revolve counter-clockwise to a position beneath the now elevated latch 220 as seen in Fig. 13. As also disclosed in Fig. 13, the stud 210 of the non-add drive pawl 198 will assume a position beneath the non-add pawl release plate 211.

Figure 5:
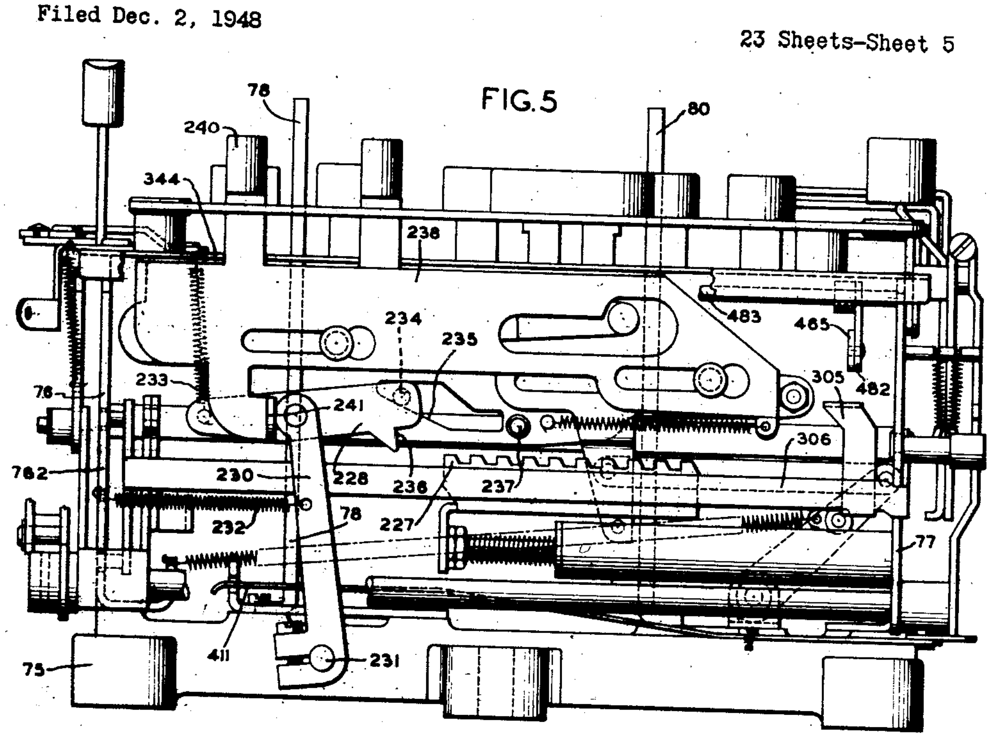
Fig. 5 is a front elevational view of the machine showing the manual carriage return features, the back-space mechanism and part of the novel multiply mechanism.
Figure 14:
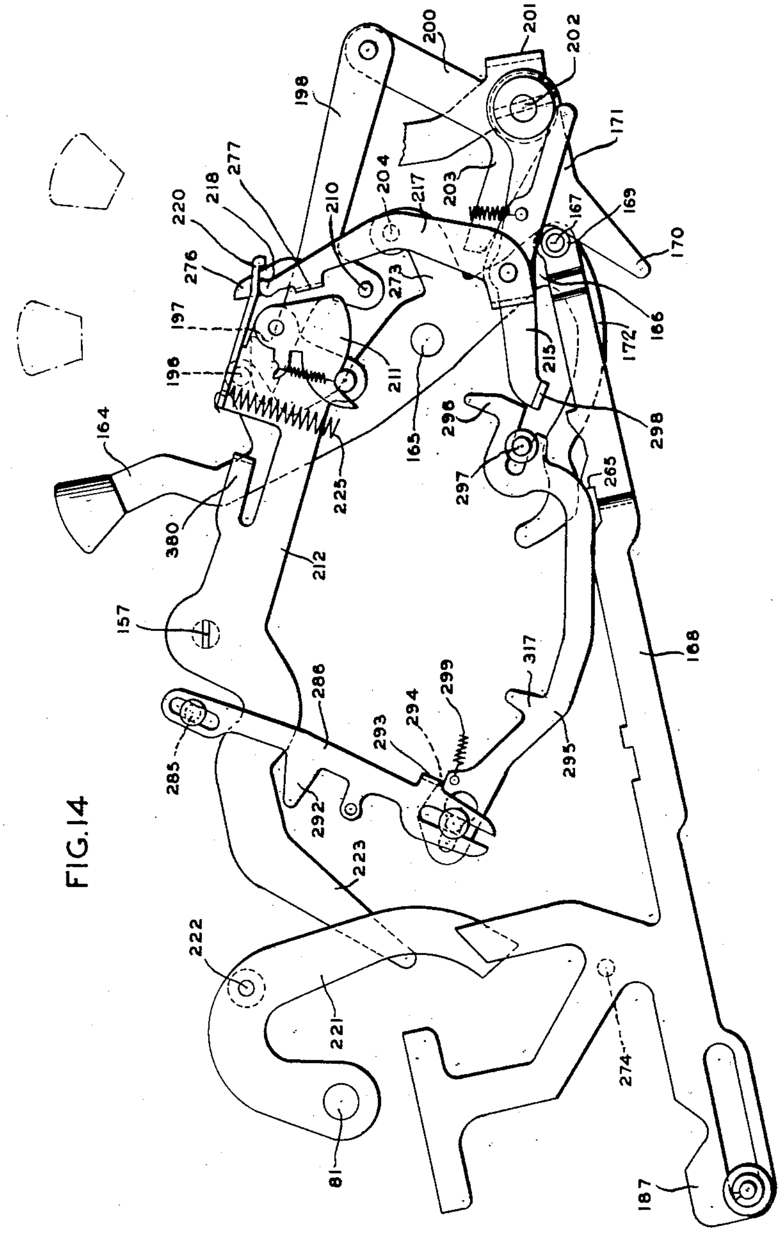
Fig. 14 is a left-hand side view of the mechanism of Fig. 13 after the main shaft has returned to normal.
Figure 15:
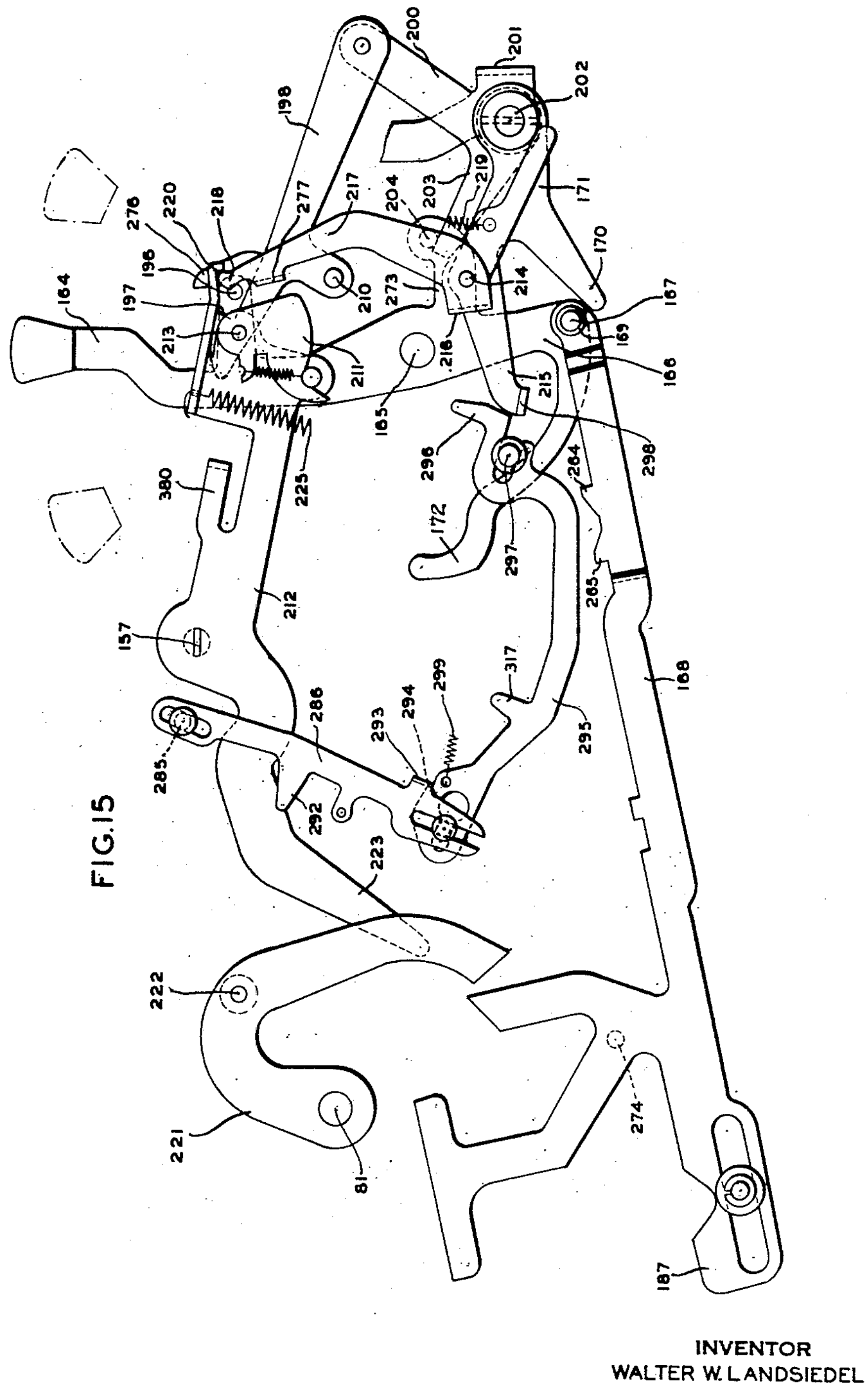
Fig. 15 is a left-hand side view of the mechanism of Fig. 14 after the multiply lever has been released to snap back to its normal position.

The main shaft 81, having reached the end of its clockwise rocking motion as viewed in Fig. 13, will then reverse its motion and return its fixed cam 221 to its normal position as shown in Fig. 14. In so doing, the pressure of the stud 222 will be removed from the upper edge of the arm 223 allowing the forward portion of the division shaft drive lever 212 to be drawn downwardly under tension of the spring 225. Since the non-add pawl release plate 211, carried by the lever 212, will now effect a downward pressure upon the underlying stud 210, it will cause the non-add pawl 198 to unlatch from the stud 196, thereby permitting the non-add pawl 198 to dart back to its normal position as viewed in Fig. 14. The non-add mechanism thereby becomes restored to its normal ineffective position. The arm 217, however, is prevented from returning to normal and its toe 218 remains latched under the extension 220 after the multiply lever 164 has been released to its normal position as seen in Fig. 15. Since the arm 217 continues to be latched under the extension 220, this arm will exert continued downward pressure from spring 225 upon the motor drive control lever 171, and, therefore, it will hold the motor switch closed for an additional add cycle automatic printing of the multiplier. After the completion of a repeat cycle, and upon the release of the multiply lever 164 from its upper multiply position, a printing cycle will be effected. Referring now to Fig. 15, the stud 222 on the back-space cam 221 is carried downward as the main shaft 81 again revolves in a clockwise direction, thereby camming the arm 223 of the division shaft drive lever 212 downwardly to raise the front extension latch 220. As the latch 220 rises, it permits the toe 218, under tension of spring 219, to escape from under its hooked extension and arm 217 is free to rise. As arm 217 rises, it allows the motor drive control lever 171 to rock clockwise to its normal position as in Fig. 2. This will cause the shaft 202 to revolve clockwise to normal, as in Fig. 2, and thereby stop the motor. During this printing cycle, the hammer restoring bail rod 71 (see also Fig. 1) is returned to its ineffective position, thereby allowing the printing hammers 63 to complete their full printing stroke. Previously, during the repeat cycles of the multiply operation, the multiply lever 164 was in its rearward position which caused the bail rod 71 to block the printing hammers. When the multiply lever 164 is restored to normal its curved arm 172 released its pressure on stud 174 to permit the rocker arm 175 to swing counterclockwise. This will cause the link 176 to be drawn rearwardly, under tension of its spring 177, to rock the bail 180 and its forwardly extending block arm 182 to ineffective position. Near the completion of the printing cycle the pin carriage is automatically back-spaced. The mechanism for back-spacing in the present machine is similar to that disclosed in the above Patent No. 2,237,881, and consequently only a brief description of it is required in this application. Referring to Fig. 5, there is shown a toothed rack 227 which is secured to the movable pin carriage 50. A pawl 228 adapted to engage the teeth of rack 227 is pivoted, at a point substantially equidistant from both of its ends, to an upright lever arm 230 which is securely fastened at its fulcrum to a longitudinal shaft 231 (see also Fig. 4). Tensioned between the arm 230 and the outer side wall 76 of the machine is a spring 232 which normally retains the arm 230 and the swingable pawl 228 in the left-hand position as shown in Fig. 5. Also tensioned between the left-hand portion of the swingable pawl 228 and the upper fixed frame is a spring 233 which continually urges the pawl 228 in a clockwise direction as viewed in Fig. 5. A roller 234 at the one end of the pawl 228 is adapted to be cammed by the inclined edge 235 of a slot in the front frame structure. When the arm 230 is caused to rock clockwise through motion of its shaft 231, the pawl 228 will rock on its pivot and, towards the completion of the stroke, a tooth 236 on the pawl will engage the rack 227 to force it and its accompanying pin carriage one step toward the right-hand side of the machine. A stud 237 fixed to the frame serves to stop the rightward movement of the pawl 228 to thereby limit such movement for a distance equivalent to one tooth space of the rack 227. There is also provided appropriate escapement mechanism (not shown) which serves to hold the stop pin carriage in any position to which it may be set. As disclosed in the above Patent No. 2,237,881, the arm 230 may be rocked to cause back-spacing of the stop pin carriage by either of two methods. Back-spacing can be effected through automatic rocking of the back-space shaft 231 or manually. Slidably mounted for horizontal lateral movement upon the front frame structure is a slide 238 having a vertically projecting finger control button 240, and at its lower left-hand surface a bent portion or wing 241 which engages the upper end of the arm 230 and serves to rock the arm in a rightwardly direction whenever manual back-spacing is desired.

Automatic means for rocking the back-space shaft 231 can be seen by reference to Figs. 2 and 4, and this means is slightly changed in structure from the mechanism disclosed in the above Patent No. 2,237,881. In the plan view, Fig. 4, it is seen that the shaft 231 extends rearwardly in the base of the machine and has secured at its rear extremity a bevel gear 242. The gear 242 is constantly in mesh with a gear segment 243, which is rigidly fastened to a transverse shaft 244. The shaft 244 extends through the left-hand frame wall. Securely fastened to the extended portion of the shaft 244 is a lever 245 (Fig. 2) a right-hand arm of which carries a pivot 249 upon which is rockably mounted a lever 246. The rockable lever 246 (see also Figs. 21 and 22) is formed with an offset lug 247. A spring 248 tensioned between a lower arm of the rockable lever 246 and the tail of the back-space lever 245 urges the lever 246 in a clockwise direction as viewed in Fig. 2. Normally, however, this tension is checked by a latch 250 which holds the lug 247 and is pivoted to the left outer frame by a stud 251. Also cooperable with the lug 247 but not normally so, is an inner back-space control pawl 252 pivoted on a stud 251. In addition, there is an outer-back-space control pawl 253 pivoted on the same stud 251. Both the inner pawl 252 and the outer pawl 253 are urged in a counter-clockwise direction by springs 254 and 255. The outer back-space control pawl 253 is formed with a curved rearwardly extending arm 256, the rear extremity of which lies directly over and is actuated by a stud 257 carried by the tail of the rearwardly extending link 176. During the normal position of the link 176 the stud 257 engages and retains the curved portion 256 of the outer back-space control pawl 253 in its full clockwise position. However, as soon as the link 176 is brought forward, through actuation of the multiply lever 164 into the rear multiply position, the stud 257 will be brought forward to permit the outer back-space control pawl 253 to swing counter-clockwise under tension of its spring 255. The upper extremity of the latch lever 250 is positioned in front of a short projection 258 of the rearwardly extending link 176. Forward motion of the link 176 will cause a stud 260 on the extension 258 to rock the latch lever 250 in a clockwise direction. This will immediately unlatch the ear 247 of the rockable lever 246 permitting the lever 246 to be rocked in a clockwise direction through tension of its spring 248 while at the same time the outer-back-space control pawl 253, as above described and by reason of the stud 257 having moved inwardly and out of the path of the curved arm 256, will allow the spring 255 to swing the pawl 253 counter-clockwise into its effective latching position. The arrangement of the outer pawl 253 is adapted, whenever it is held in its effective position, i. e., swung around counter-clockwise, to be positioned similarly to the underlying latch lever 250 which, as previously explained, serves the same latching purpose when it is in its normal position for addition and subtraction. When, however, the multiply lever 164 has been pushed rearwardly for multiplication, the latch lever 250 is revolved clockwise out of its effective position by the rearwardly extending link 176. Then the function of holding the rockable lever 246 in the position shown in Fig. 2 is taken over by the outer back-space control pawl 253. When the back-space cam 221 has been rotated a half revolution clockwise, and then reversed in a counter-clockwise direction to its normal position, the effective edge of the cam 221 will merely brush over the roller 261 which is pivotally carried on the rockable lever 246. The lever 246 wil be slightly revolved counter-clockwise but will communicate no effective motion to the back-space lever 245 on which it is pivoted; consequently no rocking of the transverse back-space shaft 244 will be effected while the rockable lever 246 is latched by either the latch lever 250 or the outer back-space control pawl 253.

As soon as the required number of repeat cycles for one digit of the multiplier have been completed, the multiply lever 164 is manually released. Before the multiply lever can be released, however, its operating cycle must be completed. This is effected through a latch device similar to that disclosed in the above Patent No. 2,237,881 and requires only a brief description. On the dial rack raising slide 168 there is formed a shoulder 264 and also a shoulder 265 cooperating with a latch lever 266 which is fixed to a shaft 267. The shaft 267 extends transversely through the machine and projects through the right hand outer side frame 77 (Fig. 3). At the right hand extremity of the shaft 267 there is fixed a short arm 268. Loosely mounted on the shaft 267 there is a latch lever 270 carrying a fixed stud 271. The stud 271 is slidably connected with a slot 272 formed in the previously mentioned latch release link 262. Whenever the multiply lever 164 is pushed either forwardly or rearwardly for a multiply cycle, either of the shoulders 264 or 265 (Fig. 2) of the slide 168 will be engaged by the latch lever 266 to hold the slide latched until the completion of the cycle. Referring now to Fig. 8, it will be seen that the link 262 is connected to the stud 119 carried by the bail lever 114. Upon the completion of a multiply cycle, the previously mentioned plate member 132 will have carried its cam nose 140 counter-clockwise for one whole revolution. As the cam nose 140 rises to pass the stud 119 on the bail lever 114, the stud 119 will be cammed rearwardly to rock the bail member 114 counter-clockwise (as seen in Fig. 8) while at the same time urging the link 262 in a rearward direction. Since the front end of the link 262 is slidably connected to the stud 271, (Fig. 3) this link will draw the stud 271 rearwardly against arm 268 to rock it clockwise. Since the arm 268 is fast to the transverse shaft 267, a corresponding motion will be communicated to the latch release lever 266 fast to shaft 267, on the opposite left-hand side of the machine. The latch lever 266, as viewed in Fig. 2 will now be rocked counter-clockwise to lift its latch arm and thereby permit the link 168 and the multiply lever 164 to return to normal. As the multiply lever 164 is allowed to return to normal, thereby effecting printing and back-spacing operations in the following add cycle, the back-space cam 221 on the main shaft 81 will revolve counter-clockwise to its normal position. As soon as the cycle has progressed sufficiently to release the previously described latching mechanism which holds link 168, this link 168 will be returned to normal and in so doing will permit the link 176 to be drawn rearwardly. This will unlatch the rockable lever 246, permitting it to be swung clockwise under tension of its spring 248. This will cause the ear 247 to limit against an extension 259 formed on the rear edge of the back-space lever 245 and will also bring the roller 261 into the path of the back-space cam 221. As the back-space cam 221 rocks counter-clockwise on its return motion, the effective edge of the cam will strike the roller 261 and thereby rock the back-space lever 245 and the shaft 244, to which the lever is fixed, clockwise. Whenever the back-space shaft 244 is thus rocked clockwise it will cause a back-space operation of the pin carriage 50 through the previously described gear segment 243, gear 242 and shaft 231.

*Zero printing*

Figure 16:
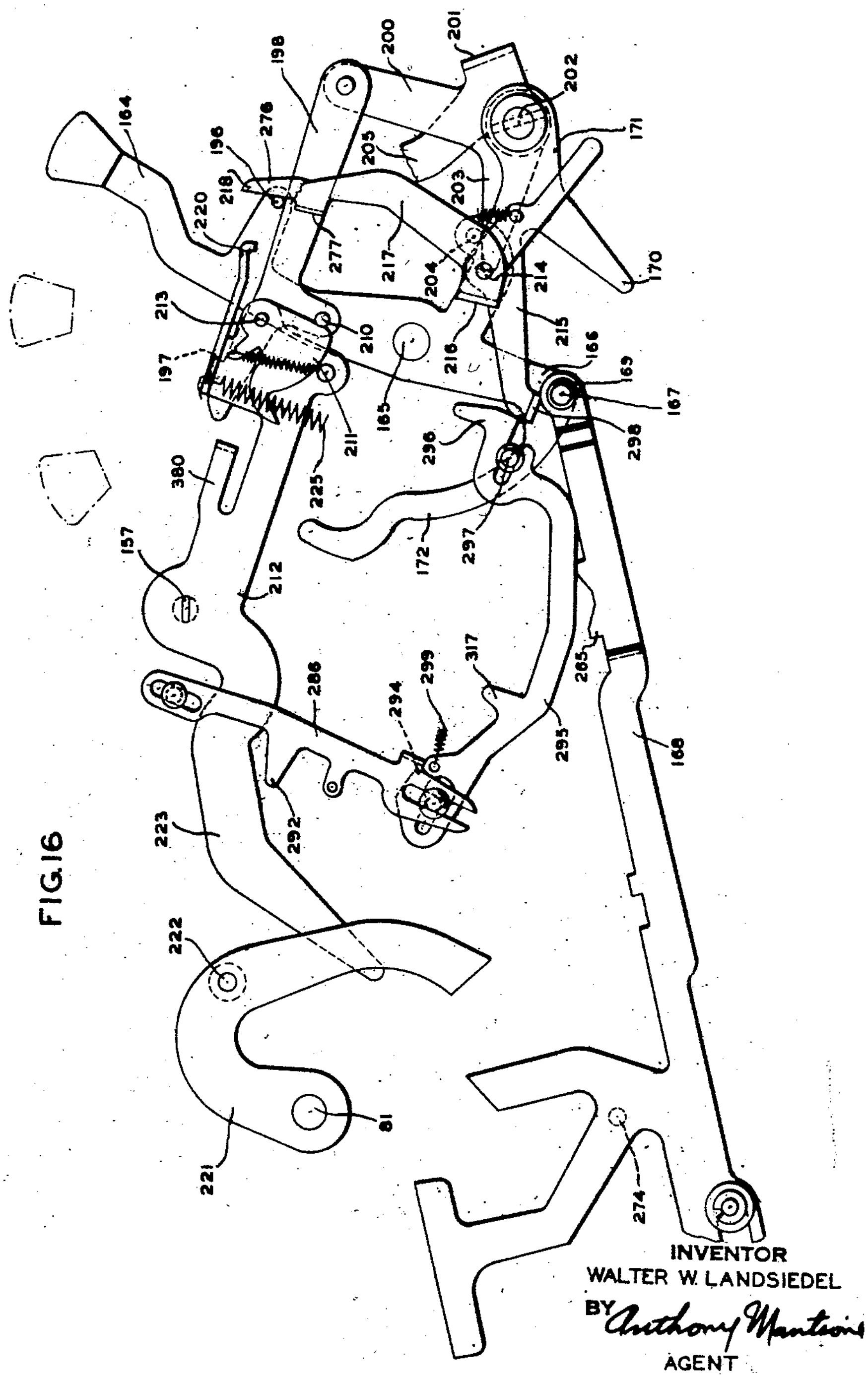
Fig. 16 is a detail left-hand side view of the multiplier automatic printing mechanism with the multiply lever in the cipher position.

Multiplication problems wherein a cipher forms part of the multiplier, is accomplished with a single operation which is similar in certain respects to the one disclosed in the above Patent No. 2,237,881. This operation, ordinarily referred to as zero printing, is effected by pulling the multiply lever 164 towards the front of the machine, as shown in Fig. 16, and then immediately releasing it. This will serve to cycle the machine once to provide a print, non-add and a back-space cycle. It will be seen, by referring to the multiply mechanism as shown in Fig. 2, which is its normal position and again in the zero printing position of Fig. 16, that forward motion of the multiply lever 164 will cause its fixed stud 204, carried on the rightwardly extended branch 273, to describe a downwardly directed arc. In so doing, the downwardly moving stud 204 will depress the arm 203 to revolve counter-clockwise the arm 205 which forms a part of the bail 201 of the non-add mechanism as previously described. In addition, the stud 204 will depress the upper arm 215 of the motor starting lever 171, thereby rocking the motor operating shaft 202 to start the motor. It will be seen that frontward motion of the multiply lever 164 will not cause its curved arm 172 to communciate any motion to the stud 174. Consequently, the rearwardly extending link 176 will not be drawn forward, as was the case when the multiply arm 164 was pushed rearward to multiply with a significant digit. Since the link 176 remains stationary throughout the entire cipher printing stroke, it will be obvious that the hammer block arm 182 will remain in its depressed position, thus allowing the printing hammers 63 to complete a printing operation during the zero cycle. The dial rack raising slide 168 previously described, will now be moved rearwardly by reason of the frontward motion of the multiply lever 164. A stud 274 fixedly carried on the inner side of the slide 168 (Fig. 2) will strike against the ear 275 which forms part of the latch lever 250. This will rock the latch lever 250 clockwise to unlatch the rockable lever 246, thereby conditioning the back-space lever 245 for a back-spacing operation. Back-spacing will be effected by the counter-clockwise rotation of the back-space cam 221 which cams the roller 261 as the cam returns to its normal position (Fig. 2). When the arm 215 is depressed by the overlying stud 204 (which also depresses arm 203) through forward motion of the multiply arm 164, (Fig. 16) it will be seen that the toe 218 (Fig. 13) of the arm 217 will be carried downwardly since it is pivoted thereto. To prevent the toe 218 from latching under the extension 220, which occurs only when the multiply lever 164 is pushed rearwardly, the stud 196 of the multiply lever strikes against the extension 276 of the bail 277 which forms part of the arm 217. As the multiply arm 164 is brought further towards the front of the machine, it will urge the extension 276 of the arm 217 also in a frontward direction and away from the latch 220. If this means to prevent latching of the toe 218 during zero printing were not provided, the motor lever 171 would be incorrectly held for an extra cycle as would be the normal procedure when multiplying with a whole digit. In zero printing however, the hammers are not blocked as in the case when cycling with a significant digit takes place; in multiplying with a cipher, printing takes effect immediately and no extra printing cycle is required.

*Automatic product mechanism*

In a multiplying operation it is necessary that the stop pin carriage be returned and the machine totaled to obtain the product which has resulted from a series of additions stored in the accumulator. As mentioned earlier in the present application, this was accomplished in my previously disclosed machine the above Patent No. 2,237,881 by moving the correction slide rightwardly to a fully operated position and, while holding the correction slide in this position, cycling the machine through two successive cycles of operation by depressing the add-total bar twice. These manual steps formerly required for obtaining the product of a multiplication problem have been completely dispensed with in the machine disclosed in the present application.

Figures 29, 31:
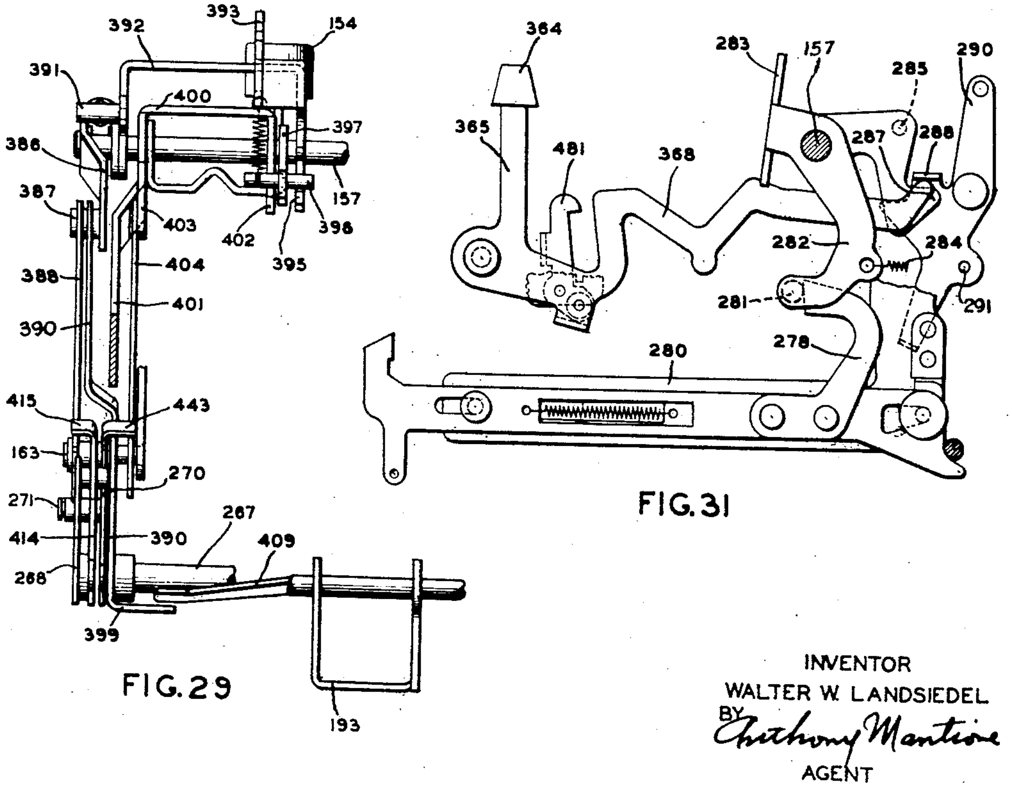
Fig. 29 is a rear view of the division automatic remainder mechanism of Fig. 28.
Fig. 31 is a detail view of a portion of the automatic stop mechanism used both for multiplication and division.

Referring first to Fig. 31, there is shown a curved extension 278 securely fixed to the units column add rack 280. A stud 281 fixed to the dependent arm 282 of the bail 283 is positioned normally as shown in Fig. 31 with the upper extremity of the extension 278 engaging the stud 281. It is to be understood that the bail member 283 will be prevented from turning counter-clockwise (as viewed in Fig. 31) provided that the units rack 280 is either in its normal unoperated condition (Fig. 1) or else intercepted by a zero stop in the units column. Whenever the stop pin carriage 50 has been back-spaced (an operation occurring directly after a printing of the multiplicand has taken effect) and should a significant digit of the pre-set multiplicand reach the units column, then the automatic product mechanism will be conditioned for operation. The significant digit stop which reaches the units column will intercept the adding rack 280 thereby carrying the extension 278 sufficiently rearward to permit the bail 283, under tension of the spring 284, to rock counter-clockwise, as viewed in Fig. 31. Now referring to Fig. 2, it will be seen that the bail member 283, loosely pivoted on the division shaft 157, carries a fixed stud 285 (see also Figs. 1 and 2) slidably connected to the upper slotted end of the vertical latch link 286. Whenever the units column add rack 280 of Fig. 31 has been limited on any stop above the zero stop, the curved extension 278 will permit the bail 283 to rock sufficiently clockwise in Fig. 2 to raise the stud 285, thereby lifting the vertical lock link 286. Referring still to the left side view Fig. 2 and also to Fig. 31, it will be seen that when the bail 283 is revolved clockwise, (Fig. 2) as has been presently described, the extension 287 of the bail will lift the ear 288 of the rocker arm 290, thereby revolving the rocker arm 290 counter-clockwise as in Figs. 17, 18. The rocker arm 290 carries a fixed stud 291 which, whenever the rocker arm is revolved counter-clockwise as in Fig. 17 and Fig. 18, cams the ear 292 forming part of the vertical lock link 286. Through this structure, the vertical lock link 286 will be carried upwardly in order that its bent ear 293 can clear the latch 294 (Fig. 12) formed on the horizontal slide 295. Normally the horizontal slide 295 is latched by the vertical lock link 286 as in Fig. 2. The right-hand extremity of the horizontal latch slide 295 is formed with a slot breaking out to form an extension 296 which is slidably supported on the stud 297 fixed to the left-hand outer frame 76. The extension 296 is adapted to latch the ear 298 of the arm 215. Inasmuch as the arm 215, forming part of the lever 171, controls the motor operating shaft 202, it can readily be seen that when the ear 298 is latched by the frontward movement of the horizontal slide 295, the lever 171 will be held in a counter-clockwise revolved position to hold the motor contacts closed until the ear 298 is unlatched. Through the mechanism just described, it can be further seen that whenever the lowest significant digit of a multiplier reaches the units column, bail 283, as previously explained, will cause the vertical lock link 286 to be lifted upwardly, thereby unlocking the horizontal latch slide 295. This will permit the spring 299 to draw the slide 295 frontward in order for it to hold down the arm 215 and connecting parts thereof to the motor contacts. The arm 215 is held in operating position until the total mechanism restores the horizontal slide 295 to its locked position. This operation will be explained in greater detail at a further point herein.

Figure 17:
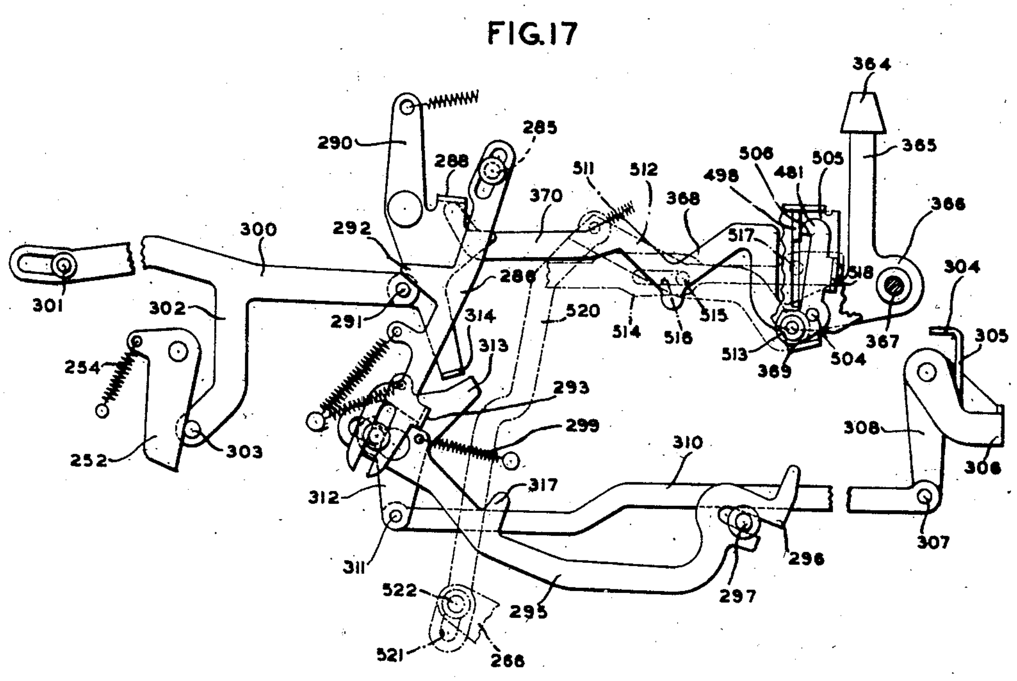
Fig. 17 is a detail left-hand side view of the multiply and division release key mechanism in normal position.
Figure 21:
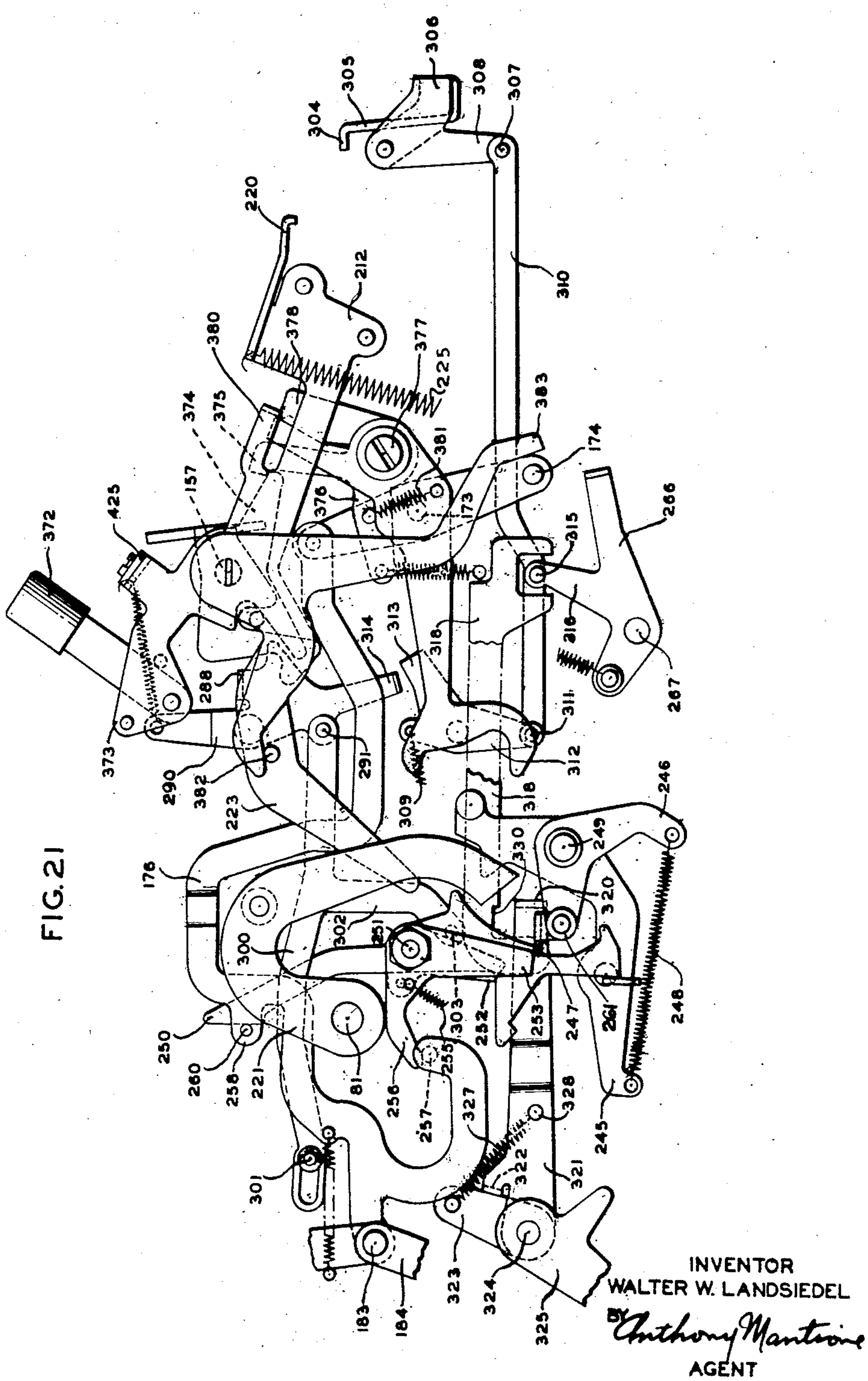
Fig. 21 is a detail view of the division automatic remainder mechanism, while in normal position.
Figure 22:
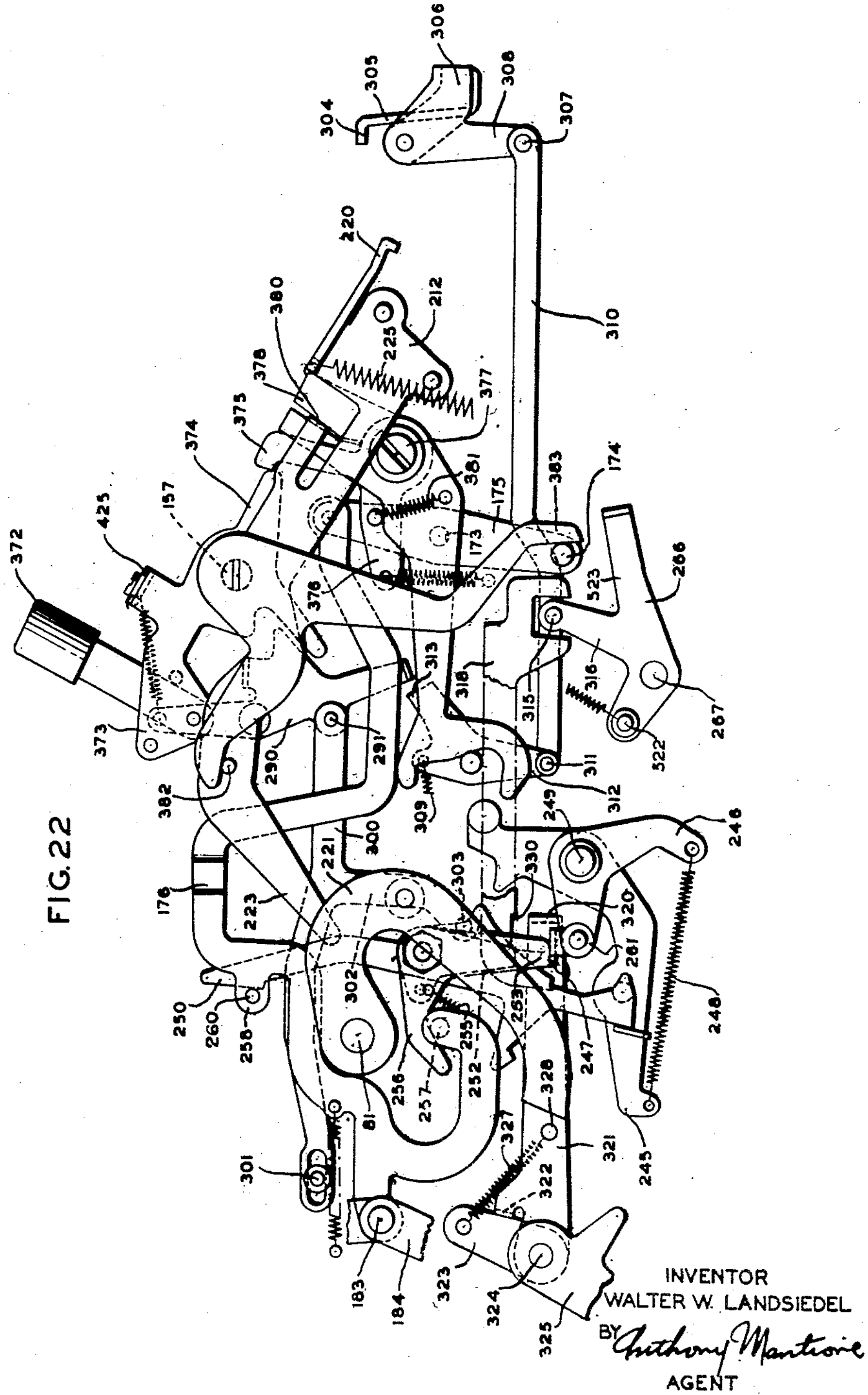
Fig. 22 is a view in operating position of the mechanism shown in Fig. 21.

Referring now to the rocker arm 290 (Figs. 2, 17, 18, and 31) there is pivoted on the stud 291, which forms part of the rocker arm 290, the back-space blocking link 300. The link 300 is slidably supported by a stud 301 which engages a rear slot formed in the body of the link. A depending arm 302 which forms part of the link 300 is normally positioned as in Fig. 2 and in Fig. 17. In the normal position, a stud 303, fixed to the dependent arm 302, limits against the inner back-space control pawl 252 holding it rearward against tension of the spring 254 which renders the pawl ineffective to latch the rockable lever 246 (Figs. 21 and 22). When, however, the link 300 is drawn frontwardly by the rocker arm 290, the depending arm 302 will be carried forwardly to permit the inner control pawl 252 to swing counter-clockwise, as viewed from Fig. 2, to its effective latching position. It can be seen, therefore, that at the end of a repeat operation, the stud 257 of the rearwardly extending link 176, by reason of the multiply lever 164 being returned to its normal position, will release the rockable lever 246. As the rockable lever 246 pivots clockwise (Fig. 2) through tension of its spring 248, the ear 247 will be caught and held by the inner back-space control pawl 252 which has now been permitted to swing to its effective position due to the frontward motion of the depending arm 302 (Fig. 17). Now, when the bail 283 returns to normal through restoration of the adding racks, the rocker arm 290 will not return to normal but will be held in its revolved, or counter-clockwise position as in Fig. 2. This is accomplished through the following mechanism. Referring to Figs. 5, 17, 18, 21 and 22, there is shown an ear 304 on the upright arm 305 which forms part of the blank stroke bail 306. The bail 306 extends transversely across the front of the machine as in Fig. 5, and is pivotally mounted upon the outer side walls 76 and 77. Downward motion of the bail is limited by a stud 307 carried by the depending bail arm 308 striking against a portion of the left-hand frame. Upward motion of the blank stroke bail 306 is limited by the ear 304 which is positioned against the escapement rack of the stop carriage 50 whenever the stop carriage is in its fully restored or so-called normal position. When, however, any digit of the keyboard is depressed, the escapement mechanism of the stop carriage will operate to effect a leftward step of the travelling pin carriage. An example of this would be the setting up of a multiplicand for the performance of a multiplication problem. As soon as the first digit of the multiplicand is entered, the pin carriage 50 will be spaced leftward to unlatch the ear 304 of the blank stroke bail 306. As soon as the ear 304 is freed (Figs. 17, 18, 21 and 22), the bail 306 will revolve counter-clockwise as in Fig. 21 through tension from the spring 309. It will be seen, that on the previously described stud 307 of the depending bail arm 308, there is pivotally connected a blank stroke bail link 310 which extends rearwardly and is pivotally connected by a stud 311 to the bell-crank 312. When the blank stroke bail link 310 is permitted to advance in a forward direction, it will allow the spring tensioned bell-crank 312 to revolve counter-clockwise. This will carry the arm 313, formed on the bell-crank 312, upwardly to block the depending arm 314 of the rocker arm 290. Whenever the rocker arm 290 has been revolved by the bail 283 as heretofore described, the depending arm 314 will be swung clear of the arm 313 to permit the bell-crank 312 to revolve further under tension of its spring 309 in a counter-clockwise direction. This continues until the arm 313 reaches a position sufficiently high to block the return movement of the rocker arm 290. Through this linkage comprising the bail 306, the link 310 and the bell-crank 312, the rocker arm 290 is held counter-clockwise in its working position even though the bail 283 has returned to normal. When the repeat cycles of the multiply operation have been completed, the inner back-space control pawl 252 will be holding the back-space pawl 246 (Fig. 2) in its depressed position. When the multiply lever 164 is released to return to its normal position, the machine will print the final digit of the multiplier and also the multiplicand to indicate the operation which is taking place. Since the multiply lever has returned to its normal position, the dial rack raising slide 168 will have positioned its rear V-shaped groove as in Fig. 2 in order that the roller 185, previously raised during the repeat cycles to prevent backspacing (Fig. 11), may now be disabled by dropping into the V-shaped recess formed on the dial rack raising slide 168. This permits shaft 186 to hold the arm 190 elevated so as to prevent its stud 191 from camming the sloping edge 192 of the bail-crank 193. Since the bail-crank now remains in its normal position as in Fig. 11, the slidable pin 194 will also remain in its normal or disabled position. The link 195, (Fig. 11) actuated by an arm 199 on the main shaft of the machine on every operating cycle, can now advance forwardly to strike the carriage restoring mechanism and thereby set the stop carriage for a totaling operation. Then the machine will automatically total the remainder. This is now effected, as stated earlier in the present description, by the extension 296 of the horizontal latch slide 295 (Fig. 2) which is now drawn forward by the spring 299, the vertical lock slide 286 having been raised by means of the significant digit of the multiplicand reaching the units column of slide racks. Inasmuch as the back-space pawl 246 is being held by the inner back-space control pawl 252, the machine will now restore the stop carriage 50 on the final multiplier printing operation and consequently effect the return of the rocker arm 290, the back-space blocking link 300, and the inner back-space control pawl 252, to their normal position as in Fig. 2. The vertical slide 286 is now free to drop to its normal position where it latches the slide 295 in normal position during the total cycle of the machine. The slide 295, at this stage of the multiply cycle, is next restored during the total cycle to its rearward normal position by a stud 315 on the arm 316 of the previously described latch lever 266. The manner in which this is effected is as follows:

The stud 315 (Fig. 2) projects outwardly from the arm 316 formed on the latch lever 266 and carries a roller thereon which cooperates with an ear 317 (Fig. 18) which forms part of the horizontal slide 295. The stud 315, however, is elongated to project through the inner side of the arm 316, thereby to be actuated by the total slide 318. It can be seen in Figs. 21 and 22 that the stud 315 is located so as to engage the notched portion of the total slide 318. Totaling mechanism is provided similar to that disclosed in the above previous Patent No. 2,203,336, wherein the first idle stroke following a computing operation results in the unlocking of the total slide. Since the total taking mechanism is fully described in the above patent, it is not necessary to describe the mechanism herein except to state that at one point during the blank stroke the total link 318 (Figs. 21 and 22) is free to jump forward but is prevented from doing so by the ear 320 of the arm 321. A further ear 322 (Fig. 21) of the arm 321 is positioned normally against the lever arm 323 which forms part of the hammer firing mechanism (not shown). Referring now to Fig. 8, there is pivotally fixed to the hammer trip shaft 324 an arm 325 which is positioned in such a manner as to be tripped clockwise by a stud 326 projecting from the drive plate 132. When the drive plate 132 is revolved counter-clockwise it will rock the shaft 324 clockwise during a portion of each revolution of the plate 132. The shaft 324 is carried transversely across the machine and journaled in the outer side frames 76 and 77. Referring to Fig. 21, it will be seen that the left-hand end of the shaft fixedly carries the previously mentioned arm 323 against which the ear 322 is positioned. A spring 327 fastened to the arm 323 and to a stud 328 fixed to the arm 321 is provided to support the arm 321 in such a way that the ear 322 will follow the lever 323 when the shaft 324 is rocked counter-clockwise as in Fig. 21. In this manner the arm 321 is caused to swing upwardly in a counter-clockwise direction until the ear 320 limits against the lower edge of the total lock link 318. In its raised position, the ear 320 will restrict any horizontal movement of the total lock link 318 by reason of the rear slot 330 which forms part of the link 318. As soon as the hammers have been fired to print the product, the arm 321 is dropped to its normal position and the total slide 318, now freed to be moved rearwardly, engages the stud 315. The stud 315 on the arm 316 is now urged rearwardly to cam the ear 317 (Figs. 2, 17 and 18), formed on the horizontal slide 295, to carry the slide rearwardly, thereby unlatching the ear 298 (Fig. 14) which has been holding the motor lever 171 for a totaling operation. The motor lever 171 will now be raised to its normal position through tension of the spring 219 to automatically stop the operation of the machine.

*Multiply lever latching mechanism*

Mechanism for locking the dial rack slide 168 during multiplication and also to retain the multiply lever 164 in its operating position until the cycle of operation has been completed, is disclosed in the form of a vertical slide 331 (Fig. 2) having a curved extension 332 which is adapted to overlie a fixed stud 333 projecting from the outer surface of the back-space cam 221. The lower extremity of the member 331 is provided with a slot 334 and is slidably supported thereon by a stud 335 fixed to the left-hand outer frame 76. A spring 336 is provided for urging the slide 331 downwardly towards its depressed position which occurs when the back-space cam 221 is revolved clockwise during an operating cycle, thereby removing its stud 333 from support of the curved extension 332. When, however, the multiply lever has been brought to normal position after a repeat operation, an ear 337 forming part of the slide 331 will drop into a shouldered slot 338 in the dial rack raising slide 168, thereby locking the slide 168 to prevent any horizontal movement thereof. This will obviously prevent any actuation of the multiply lever 164 until the subsequent cycles after a repeat cycle have been effected. Whenever the ear 337 of the vertical slide has dropped into the shouldered slot 338, it will restrain any movement of the multiply lever 164 until such time as the back-space cam 221 has revolved counter-clockwise (as in Fig. 2) to its highest or normal position. The stud 333 will then raise the multiply lever lock slide 331 out of the shouldered slot 338 of the dial rack raising slide 168.

Figure 6:
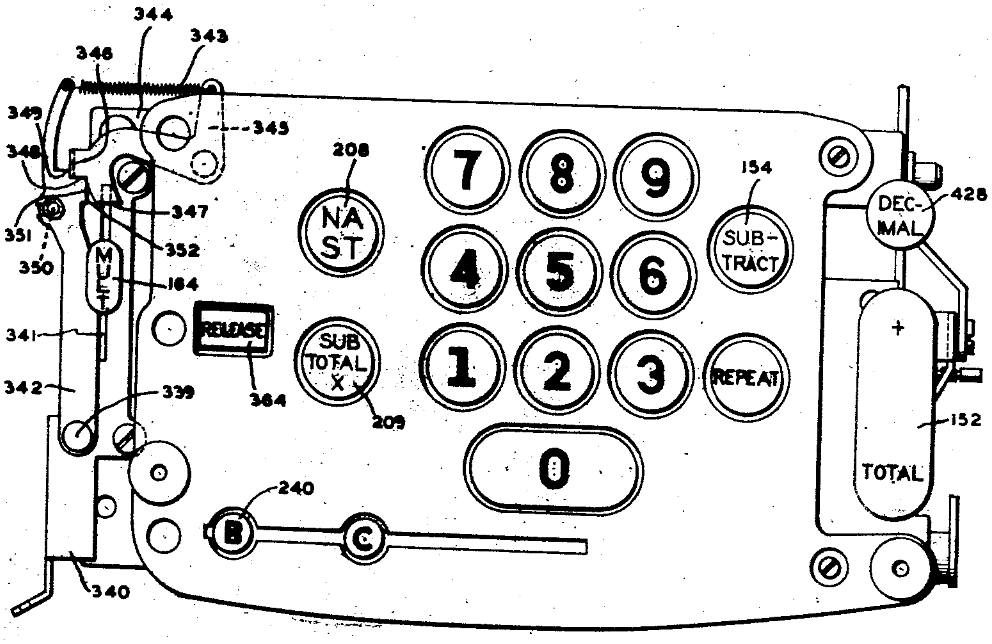
Fig. 6 is a detail plan view of the keyboard of the machine.

It will be evident that, during the process of multiplication, should the operator push the multiply lever 164 rearward for cycling and then hesitate without distinctly completing the rearward movement in a single stroke, a misoperation might result. As an example, if the operator should not allow the multiply lever to be brought rearward far enough to pick up the non-add drive pawl 198 (Fig. 2), it cannot be pushed to the rear of the machine for another operation. Should this occur, the first operation would fail to non-add, furnishing thereby an erroneous answer to the multiplication problem. In order to eliminate this possibility there is shown (Fig. 6) a multiply lever guide plate 340 having a slot 341 adapted for slidably guiding the multiply lever 164 in its rearward or frontward strokes. Pivoted to a fixed stud 339 in the guide plate 340 is a pawl 342 which is normally urged in a clockwise direction by the spring 343. In addition there is pivoted to the sub-keyboard 344 on a plane level with the pawl 342 a bell-crank 345 having an ear 346 and a shoulder 347. The bell-crank 345 is urged continually in a counter-clockwise direction (as seen in Fig. 6) by means of the spring 343 which is used also to tension the pawl 342. The pawl 342 is formed with a stepped shoulder consisting of steps 348 and 349. Normally, the ear 346 of the bell-crank 345 is latched onto the first step 348 of the single stroke pawl 342. It is to be seen also that counter-clockwise movement of the single stroke pawl 342 is limited by a stud 350 fixed to the multiply lever guide plate 340 and which projects through a slot formed in the pawl 342. The inner edge of the pawl which is adjacent to the multiply lever 164, while in its normal position, limits any clockwise movement of the pawl. As the multiply lever 164 is pushed rearward, the inner edge of the pawl 342 recedes in an outward sloping direction which permits the pawl 342 to swing clockwise provided the ear 346 of the bell-crank 345 is not positioned against the step 348 as normally is the case. As the multiply lever 164 is continued rearward it will strike the shoulder 347 of the bell-crank 345, thereby rocking the bell-crank to shift its ear 346 from the ste p 348. Since the multiply lever 164 has now moved rearwardly, its left-hand edge no longer restrains the pawl 342 from swinging clockwise. This permits the step 349 of the pawl 342 to shift under the ear 346 of the bell-crank 345. The multiply lever 164 can now be continued rearwardly to complete the cycling operation, gliding past the inner edge 351 of the pawl 342 and rocking the bell-crank 345 without opposition. Should the multiply lever, in its rearward stroke, advance far enough to shift the ear 346 of the bell-crank 345 from the step 348 to the step 349, and then be pulled slightly frontward, the pawl 342 will continue to swing clockwise to carry its shoulder 352 in front of the leading edge 353 (Fig. 2) of the multiply lever 164. The shoulder 352 will then act as a bar to positively restrain any further rearward movement of the multiply lever 164. The only alternative is to return the multiply lever to its normal central position and start the complete rearward stroke over again with a single sweep motion.

*Summary of Multiplication*

A general description and sample printing of a multiplication problem will be illustrated at this point. Considering the problem 1357×304, the first step consists in clearing the machine by depressing the add-total bar 152 which produces a clear signal indicated by an asterisk. The second step consists of entering the multiplicand on the keyboard in numerical sequence 1357 plus as many ciphers as there are digits in the multiplier, less one. In the above example, the multiplier 304 contains three digits; thus two ciphers are added, since 3 less one is 2. The entire keyboard entry would appear therefore, as 135700. It is to be noted that the number of ciphers added is always under control of the number of digits in the multiplier as for example, a four digit multiplier would require the addition of three ciphers, whereas a two digit multiplier would necessitate the addition of one cipher only. With the multiplicand entered, the following, or third, step consists of the actual multiply operation itself. This is accomplished by shifting the multiply lever 164 to record the multiplier digits 304 in numerical sequence as follows:

For the 3, the multiply lever is moved rearwardly and held for three revolutions. The machine revolutions can be counted mentally or by referring to the counting dial 371 (Fig. 2). The counting dial, as disclosed in the above Patent No. 2,255,622, indicates the number of revolutions or cycles made by the machine for each digit of the multiplier when the multiplying lever 164 is held in the multiplying position. The multiply lever is then released and allowed to return to its neutral position which causes the machine to print the correct figure of the multiplier as well as the amount on the keyboard. It also automatically back-spaces the keyboard amount one digit. The printing on the tape will now appear as follows:

| | |
|---|---|
| 3 | 135700 |

For the cipher, the middle digit of the multiplier factor, the multiply lever is moved forwardly to the cipher position for one revolution. It is immediately released and the printing, as a result, will appear as follows:

| | |
|---|---|
| 3 | 135700 |
| 0 | 13570 |

For the 4, the multiply lever 164 is again moved rearwardly and held in the rear multiply position for four cycles. It is released immediately upon the fourth cycle. The machine will automatically print the last multiplier digit 4 and then print the product. The printing of the entire problem will appear as follows:

| | |
|---|---|
| 3 | 135700 |
| 0 | 13570 |
| 4 | 1357 |
| | 412528 |

It will be noted that the amount 1357 appearing on the third line represents the multiplicand, the vertical digits 304 represent the multiplier and the last amount 412528 represents the product.

*Decimal pre-selector carriage*

Figure 19:
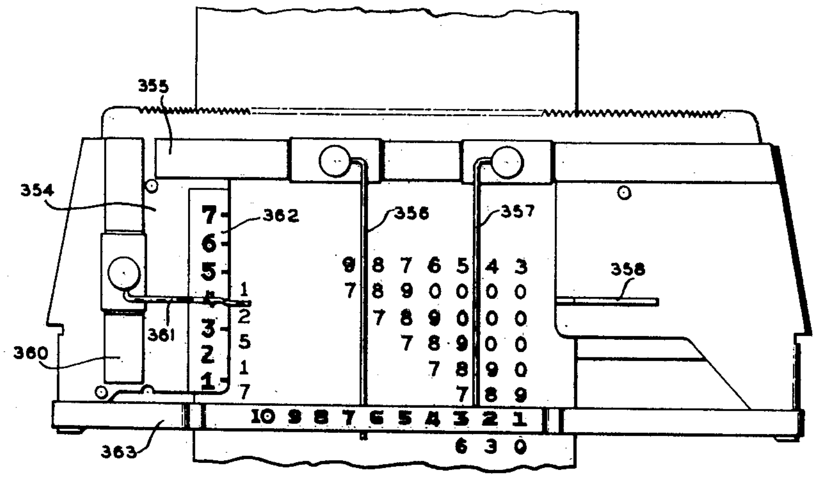
Fig. 19 is a front elevation of the paper carriage disclosing the automatic decimal pre-fixing device for use in division problems.
Figure 20:
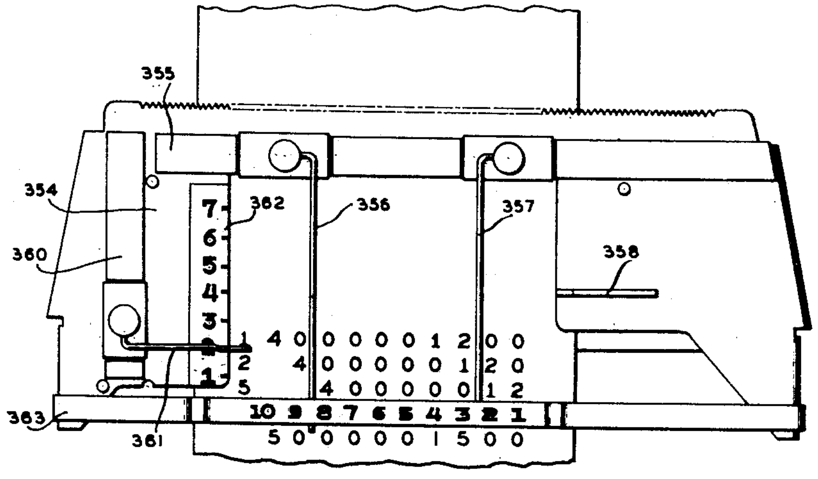
Fig. 20 is a front elevation of the device of Fig. 19 illustrating its use in dual multiplication.

A device for pointing off decimal points which occur during multiplication and division problems is shown in Figs. 19 and 20. There is mounted across the paper table 354 a flat metal strip 355 slightly spaced from the paper table to permit movement of the advancing paper tape beneath. Slidably mounted on the metal strip 355 are two index pointers, 356 and 357, preferably of wire construction. Inasmuch as these index pointers are horizontally slidable across the face of the paper tape they can be moved to any column of printed figures. When not in use, they are pushed to the right-hand side where they can be held in a stationary position by a raised metal projection 358. Vertically mounted on the left-hand side of the paper table is a flat metal strip 360 similar to the horizontal strip 355. A single wire pointer or decimal indicator 361 similar to the vertical pointers 356 and 357 is slidably carried on the strip 358 and is adapted to ascend or descend over a quotient scale, the use of which will be described later in conjunction with division problems. The quotient scale is formed on the metal frame of the paper table from a vertical series of digits stamped in the metal frame and consisting of the numbers one to seven inclusive. It is to be understood that this series of numbers need not be limited to seven; other and larger amounts may be used depending upon the columnar capacity of the machine and the number of decimal places desired in the finished product. As shown in the present application, the quotient scale 362 is an integral part of the paper table 354. Pivoted to the lower right and left-hand side of the paper table 354 is a bail shaped member 363 known as the value gauge. This gauge carries a series of numbers indicative of the digit columns of the machine. Inasmuch as the present construction is directed to a ten-column machine, the value gauge shown in Figs. 19 and 20, therefore, carries the figures 1 to 10, when reading from right to left. The figures on this gauge are differentially designed so that the value of the amounts or quantities printed on the tape can be immediately determined, regardless of whether it be dollars and cents, or units. This scale is of importance in reducing the time required for positioning the dividend and divisor, and its usage will be described later in this specification. In order to determine the number of decimals in the multiplicand and the multiplier, the left-hand decimal pointer 356 is then moved to a digital position on the value gauge 363 which is equal to the sum of the decimals in the multiplicand and in the multiplier. The decimal pointer 356 will then indicate the correct decimal point in the product of the multiplication problem. The use of the dual index pointers is well adapted for problems which involve dual multiplication. An example of this type of multiplication is shown in Fig. 20. In this view there is shown the problem of calculating the total wages to be paid for a work week of 48 hours. The wage rate is $1.25 per hour with overtime rates commencing after 40 hours. The most expedient way to handle this problem in a machine of the present construction is to split the calculation into two parts and to perform both calculations simultaneously. The first line of the multiplicand is pre-set on the keyboard and printed as shown on the paper tape in Fig. 20. The basic 40 hours is set up first so that it will be printed on the left-hand side of the tape. Then a series of ciphers, sufficient to split the first part of the multiplicand (40 hours) from the overtime hours, is entered. Inasmuch as the overtime hours are paid for at the rate of time-and-a-half for all time over 40 hours, then the actual overtime hours in present case, i. e., 8 hours, can be converted to 12 hours straight time and entered on the keyboard as such. Referring to Fig. 20, it will be noted that the two multiplicands are printed on the tape in such a manner that the 40 (hours) is printed at the extreme left and the 12 (hours) is printed at the extreme right with ciphers to the right of each multiplicand in accordance with the digits in the multiplier. The distance between the multiplicands is spaced with ciphers. The two index pointers, 356 and 357, can now be utilized to great advantage by first moving index pointer 356 leftward to indicate the decimal column of the forty hours, whereas the index pointer 357 can be used to indicate the decimal on the right-hand side. The entire multiplicand, now consisting of two separate and distinct multiplicands printed on one line as Fig. 20, can now be factored together by cycling as in regular multiplication. Using a multiplier of 125 to represent the hourly wage rate of $1.25, the product is obtained as described previously under automatic multiplication. The straight time wages in dollars and cents will be indicated on one side of the tape while the overtime wages will be indicated in dollars and cents on the other side. The index pointers can be left unchanged in this position in cases, as for example, payroll applications involving a series of similar calculations. In such cases the vertical scale decimal pointer 361 can be moved to indicate the decimal point of the wage rate or multiplier.

*Release key (as used in multiplication)*

If, during the course of a multiply problem, more ciphers have been inserted in the multiplicand than is actually necessary for the multiplier, a release key 364 (Fig. 17) is operated to eliminate the necessity of waiting for all of the ciphers to be back-spaced out of the machine. As the multiply lever is returned to normal, the machine will automatically take a blank stroke and then effect a total operation. This is accomplished in the following manner. Referring again to Fig. 17, it will be seen that the release key 364 is formed on an arm 365 of the release key lever 366. The release key lever 366 is fulcrumed on a shaft 367 which is supported by a bracket 505 (partially shown) suspended from the keyboard of the machine. An arm 368 of the lever 366 is formed with a fixed extension 370 which normally, as in Fig. 17, is positioned immediately below the ear 288 of the rocker arm 290. When the release key 364 is pulled forwardly, it will rock the release key lever 366, thereby lifting the arm 368 and the fixed extension 370. As the extension 370 rises, it engages the ear 288 of the rocker arm 290, rocking it counter-clockwise as in Fig. 18. As the rocker arm 290 is rocked, its stud 291 will be carried forwardly to cam the ear 292 on the vertical lock slide 286. The immediate effect of this camming action will raise the vertical slide 286 thereby lifting the bent ear 293 of the vertical slide to unlatch the horizontal slide 295. As soon as the horizontal slide 295 is free, the spring 299 will draw the slide 295 forward, causing the extension 296 to hold the motor lever 171 for two successive strokes, i. e., a blank stroke and a total stroke. In this manner, the multiplication cycles will terminate before their normal completion by the initiation of a totaling stroke. The method of totaling is identical with that described previously under "Automatic product mechanism" in the present application. The main difference lies in the fact that during the normal completion of a multiply problem, the ear 288 is raised by the adjacently positioned tail 287 of the bail 283 (Fig. 2) which has been actuated by a significant digit reaching the units column during the back-spacing of the pin carriage. The same ear 288 can be raised by the adjacently positioned extension 370 (Figs. 17 and 18) which is actuated, as has presently been described, by the release key 364. Through this mechanism a product can be printed at any desired time during the course of a multiply problem.

In the event that the multiply lever 164 has been pushed rearwardly in error, it can be released without the necessity of cycling the machine. This is effected through manual actuation of the release lever key 364. Referring to Fig. 17, the release key lever 366 is formed with an ear 369 to engage and cam the lowermost arm of a release latch 481 (to be described later under heading of "Non-add mechanism") which is pivoted at 504 carried by a bracket 505. The bracket 505 (partially shown) is rigidly supported from the lower keyboard of the machine. The release latch 481 carries a fixed stud and spacer 513 onto which is pivoted the forward end of a latch release arm 512 which is loosely pivoted at 515 to the bracket 505. The rearward extremity of the latch release arm 512 is supported by a spring 511 which is suspended from the lower keyboard of the machine. Pivoted to the same rear portion of the latch release arm 512 is the release arm link 520 which extends rearwardly and downwardly connecting, by means of a slot 521 formed therein, to a stud 522 fixedly carried on the previously described latch lever 266 (Fig. 2). Inasmuch as the lever 266 cooperates, as explained earlier, with the dial rack raising slide 168, serving to latch either shoulder 264 or 265 of the slide (depending upon whether the multiply lever has been pushed rearwardly for digital cycling or frontwardly to multiply with a cipher), the effect produced by the operation of the release lever key 364 will be to rock the latch release arm 512 counter-clockwise on its pivot 515 (Fig. 17) thereby depressing the release arm link 520 to rock the latch lever 266 (Fig. 2) counter-clockwise. As the lever 266 turns counter-clockwise its latch arm 523 (Fig. 22) will be raised to clear the shoulders 264 or 265, permitting the dial rack raising slide 168 to return to normal before completing the cycle. Although this mechanism has been partially disclosed in the above previous Patent No. 2,237,881 (Fig. 9 therein) it is described in the present application in connection with the release lever 364 which now performs a quadruple function which was not inherent thereof in my former disclosure. Additional features performed by the release key 364 will be described under "Division automatic stop mechanism" and also under the combined "Non-add-and-sub-totaling mechanism."

*Automatic remainder mechanism (division)*

Division is performed on the present machine by the conventional method of entering the dividend into the accumulators of the machine and then subtracting out the divisor. Should any remainder be left in the machine after the subtracting-out process is completed, it will be cleared automatically from the machine and printed upon the paper tape together with the other significant factors. One of the outstanding improvements in the accomplishment of division as performed in the present machine is the non-requirement for the operation of the repeat key. The requirement for returning the pin carriage manually, as was heretofore the case in division, has also been eliminated. This operation is now electrified and occurs automatically at the proper sequence of the division cycle.

Considering now the problem of dividing the sum of 412535 by 304. The first or initial step consists in clearing the machine by depressing the add-total bar 152, the effect of which will be indicated by a clear signal consisting of a printed asterisk. The clear signal mechanism is old in the art and need not be described in detail. The dividend is then entered on the keyboard in numerical sequence, 412535, after which the add-total bar 152 is again depressed. The pin carriage 50 carrying the depressed stop pins representative of the dividend 412535, will upon the depression of the add-total bar, limit the rearwardly moving adding racks so as to enter the dividend 412535 into the accumulator, i. e., by positioning the various columnar accumulator wheels in order to be representative of the dividend. The pin carriage 50 is returned automatically upon the entry of the dividend into the accumulator, and the depressed stop pins are cleared during the restoring portion of the add cycle. The printing on the paper tape will now appear like this:

4 1 2 5 3 5

The divisor, 304, is then entered on the keyboard. In order to position it properly with relation to the previously entered dividend, i. e., with the first digit of the divisor under the first digit of the dividend, sufficient ciphers are added by depressing the cipher bar. The division key 372 (Figs. 2, 21, 22, 23, and 24) is then tripped to actuate the division mechanism as follows:

The division key 372, formed on the division key lever 373, is loosely pivoted on the shaft 157. An arm 374 of the lever 373 normally limits against a nose 375 on the latch 376 which is pivoted at 377 to the outer left-hand side wall 76. An arm 378 of the latch 376 normally engages and holds the eared extension 380 of the division lever 212 from rocking clockwise under tension of its spring 225. The division shaft drive lever is loosely pivoted on the subtraction shaft 157. When the lever 373 is rocked counter-clockwise as in Fig. 22, it will rock the latch 376 clockwise against tension of the spring 381, thereby releasing the division lever 212 which now actuates the subtraction shaft 157 clockwise as follows. The division lever 212 extends rearwardly and, by means of its stud 382 which is fixed to the rear extension 223 thereof, is adapted to rock the subtract shaft drive lever 383 fast to the outer left-hand end of the subtraction shaft 157. A downwardly dependent arm of the lever 383 lies in a plane which enables it to contact the previously mentioned stud 174 on the rocker arm 175 (Fig. 2). Through this mechanism, which is similar to that disclosed in the above Patent No. 2,237,881, the tripping of the division key lever 373 will rock the subtraction shaft 157 clockwise (Fig. 22), will at the same time shift the link 176 frontwardly, but in addition to the features disclosed in the above Patent No. 2,237,881, will actuate through link 176, the dual speed motor drive mechanism disclosed earlier in the present application. Through this mechanism, the present machine will be operatively conditioned at its higher speed whenever it is desired to perform problems in division. Through the operation of the rearwardly extending link 176, the hammer restoring bail rod 71 will be blocked to prevent printing; also the setting of the latch lever 250 and the outer back-space control pawl 253 will be reversed to condition the back-spacing mechanism. Rocking of the subtraction shaft 157 will in addition, cause the machine to start as follows:

The subtraction shaft is carried transversely across the machine to the right hand side (Fig. 3) where it will be seen that the shaft 157 emerges from the machine and fixedly carries the division shaft lever 384 formed with the forwardly extending arm 385 and the rearwardly extending arm 386. A stud 387 fixed to the arm 386 is adapted to raise the link 388 when the subtraction shaft 157 is rocked counter-clockwise. Since the link 388 is slidably connected by means of a slot to the previously described pin 163, it will be seen that as the link 388 is raised it will carry the pin 163 upwardly to revolve the triple-armed bell-crank lever 149 counter-clockwise, thereby setting in motion mechanism previously described to close the motor contacts. The rocking of the shaft 157 will also condition the machine for subtraction. This is done by reversing the accumulator cradle through mechanism now to be described.

*Improved subtraction control mechanism*

Figure 28:
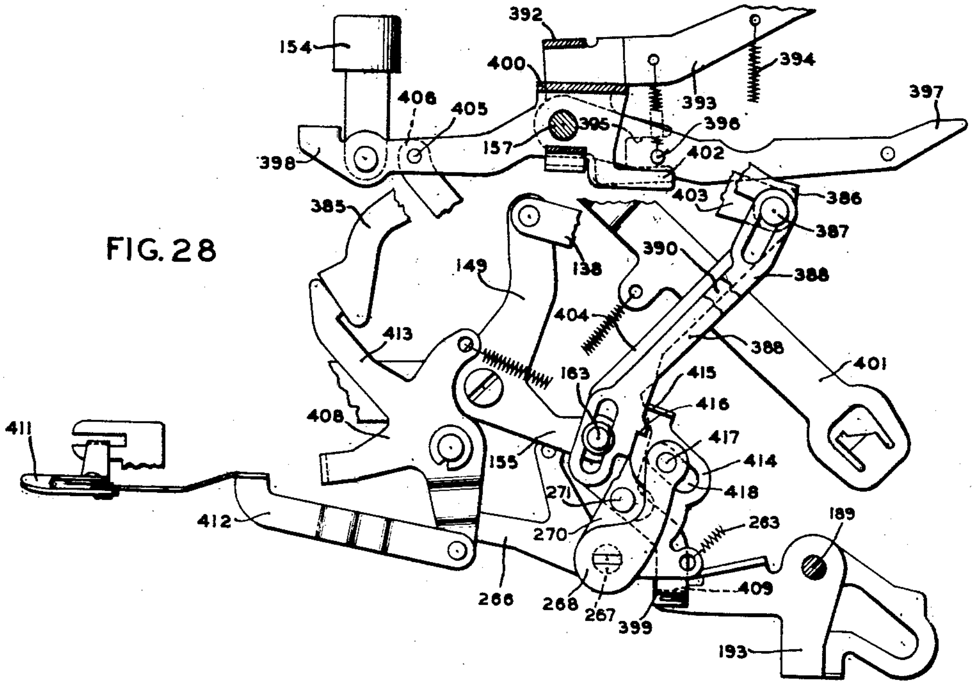
Fig. 28 is a right-hand side view showing in detail the division automatic remainder mechanism in normal position.
Figure 30:
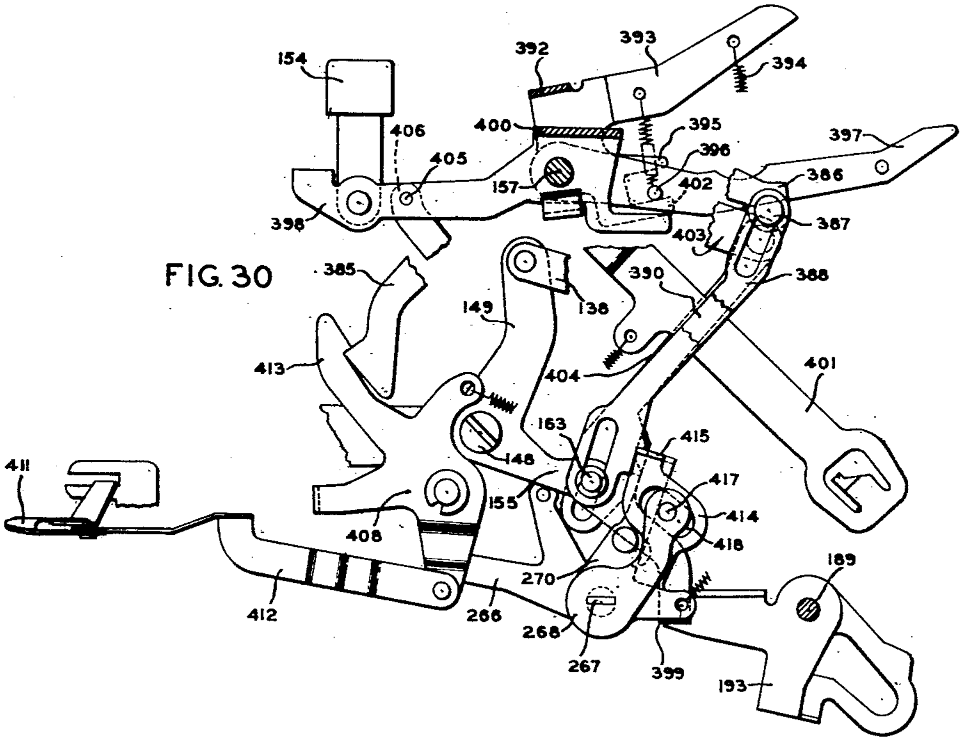
Fig. 30 is a right-hand view in operating position of the division automatic remainder mechanism.

Conditioning of the machine for subtraction is required during the process of division and it is accomplished through the following mechanism. Referring to Figs. 3, 28 and 30, it will be seen that the division shaft lever 384, when rocked counter-clockwise as in Fig. 3 by its shaft 157, will raise the fixed pin 391 carried by the subtract arm operating bail 392 which is loosely pivoted on the shaft 157. The opposite end of the bail 392 is formed with the arm 393 which, through tension of the spring 394 which is anchored at one end to a pin fixed to the frame, is urged clockwise as seen in Fig. 28. Also, formed on the inner side of the bail 392 is a bifurcated extension 395 between the arms of which is located a stud 396 fixed to and projecting through both sides of a subtract shaft yielding arm 397 which is loosely pivoted on the shaft 157. It can be seen, therefore, that when he bail 392 is rocked couner-clockwise as in Fig. 30, the lower arm of the bifurcated extension 395 will engage and lift the stud 396, thereby raising the subtract shaft yield arm 397 to condition the machine for subtraction. This is effected through the raised arm 397 which actuates the accumulator cradle reversing mechanism described in the above mentioned Patent No. 2,203,336.

Should it be desired, however, to place the machine in condition for subtraction at times other than in division, the following novel mechanism is herein provided. Still referring to Fig. 28, the subtract key 154 is pivoted to the arm 398 of the subtract operating bail 400. The bail 400 is formed on its outer side with the subtraction block arm 401 (Fig. 29), the operation of which has been described in the above mentioned Patent No. 2,255,622. The inner side of the bail 400 is provided with a short extension 402 which lies directly beneath the opposite portion of the previously described stud 396 which projects from each side of the arm 397. It can readily be seen that depression of the subtract key will rock the bail 400 counter-clockwise so that its extension 402 wil also lift the stud 396, thereby raising the yielding arm 397 which actuates the accumulator reversing mechanism. The bail 400 is formed also with a long arm 403 which extends rearwardly from the subtract shaft 157 and has pivoted to its far end a downwardly extending link 404 (Fig. 29), formed with a slot (not shown), through which extends the previously described stud 163, carried by the arm 155 of the triple-armed bell-crank lever 149. It will be seen also on Figs. 28 and 30 that the forwardly extending arm 398 of the subtract operating bail has pivoted at 405 the character index arm link 406 (partially shown only), the purpose of which is to effect operation of the character printing mechanism in order to indicate a minus sign during subtract operations. Unlike the disclosure in the above Patent No. 2,280,919, wherein the character index arm link (Fig. 2 thereof) is pivoted to the front of the subtract yield arm, the present invention discloses the character link attached to the operating arm of the bail 400. Through this linkage, the depression of the subtract key 154 will lift the link 404, thereby rocking the triple-armed bell-crank lever 149 to start the motor. In addition the block arm 401 will be raised as described in the above Patent No. 2,203,336, to positively hold the subtract key 154 in its depressed position until the end of the cycle. It will be seen, therefore, that in the present invention, unlike the mechanism shown in Fig. 14 of the Patent No. 2,203,336, a portion of the subtract shaft operating bail 400 has been removed, thereby permitting the arm 397 to be raised independently of the subtract shaft operating bail 400. The obvious purpose of this new structure is that, during a problem in division, the operation of the subtract operating bail 400, the character selector link 406, the lowering and raising of the subtract key 154, and the raising of the subtraction block arm 401 is completely dispensed with. Not only does this mechanism eliminate excessive wear of these parts, but the operation of the subtract yield arm 397 is effected at a substantially faster rate since it is now unencumbered by the additional moving parts. Thus, the subtract mechanism operates much more rapidly than that disclosed in my former patents, thereby enabling it to cooperate with the increased motor speed now provided during problems in division. Through the mechanism described, operation of the accumulator reversing mechanism is controlled and it will cause the machine to subtract out and add in by reversing the accumulator wheels until a significant digit appears in the units column of the slide racks. The actual accumulator reversing mechanism is described in the above Patents No. 2,255,622 and No. 2,237,881, and only the novel mechanism for controlling and actuating the accumulator reversing mechanism has been described herein.

Whenever a significant digit appears in the units column of the slide racks, the machine, unlike its predecessors, will blank stroke and total out the remainder in the accumulator through mechanism now to be described. Referring to Figs. 28 and 29, it will be seen that the pin 387, when lifted by the rearwardly extending arm 386 of the previously described division shaft lever 384, will raise the carriage disabling link 390 which is positioned inwardly and adjacent to the previously described outer link 388 shown in Figs. 3, 28 and 29. The link 390 is formed with a diagonal rearward extension carrying the horizontal bent ear 399 underlying the extended arm 409 of the previously described bail crank 193 (Fig. 11). As described earlier in the present application, the bail crank 193 elevates the slidable pin 194 whenever it is rocked clockwise, thereby disabling the pin carriage restoring mechanism. Through this mechanism the machine is prevented from restoring during the subtracting out operations which form part of a division problem.

Referring now to Fig. 31 it will be seen that as soon as the last significant figure of the divisor reaches the units column, bail 283 will be freed to rock counter-clockwise under tension of the spring 284. As the bail 283 revolves counter-clockwise, its fixed stud 285 (Fig. 2) will raise the undersurface of the depressed division key lever 373, thereby restoring the division key to its normal position as viewed in Fig. 2. It will also be seen in Fig. 31 that the tail 287 of the bail 283, which has now been rocked counter-clockwise by reason of a significant figure of the divisor reaching the units column, will consequently raise the ear 288 of the rocker arm 290. The rocker arm 290 which will then be rocked counter-clockwise, as seen in Figs. 2 and 22, will now draw the back-space blocking link 300 forwardly (permitting the inner back-space control pawl 252 to swing frontwardly so as to latch the back-space pawl 246. When pawl 246 is so latched it is prevented from swinging clockwise to assume its effective position which will prevent the camming action of the back-space cam 221 from operating the back-space lever 245. Through this mechanism the machine will restore on the last add-in operation instead of back-spacing. Also cooperating with this operation is the ear 304 of the bail 306 as viewed in Fig. 22.

This mechanism, described previously under "Multiplication mechanism" is utilized during the last add-in operation of division in order to hold the rocker arm 290 counter-clockwise even though the bail 283 has returned to normal. It will be seen in Fig. 2 that the depending arm 314 of the rocker arm 290 normally lies above the arm 313 of the bell-crank 312. Displacement of the pin carriage 50 away from its normal restored position unlatches the ear 304 of the blank stroke bail 306. This permits the bail 306 to rock counter-clockwise as in Fig. 21, carrying the bail link 310 forwardly and thereby rocking the bail crank 312 counter-clockwise. The arm 313, formed on the bell-crank 312 which is under tension of the spring 309, will now be carried upwardly to block the depending arm 314 of the member 290, the purpose of which arm is to hold said member 290 in its revolved counter-clockwise position after the bail 283 has returned to normal, in order to prevent the back-space mechanism from operating after the final add-in operation. The carriage 50 is then restored to its normal position, through the regular carriage restoring mechanism, after the final oversubtraction has been effected. It is to be understood that the regular sequence of operations changing from subtraction to back-space, to addition, and to subtraction, remains in the machine of the present application the same as it is in the machine of the above mentioned Patent No. 2,237,881. Only the mechanism for effecting these changes has now been improved to eliminate the manual effort which was previously required. After the final oversubtraction occurs, the accumulator wheels are reversed through mechanism similar to that disclosed in the above Patent No. 2,237,881.

Figure 23:
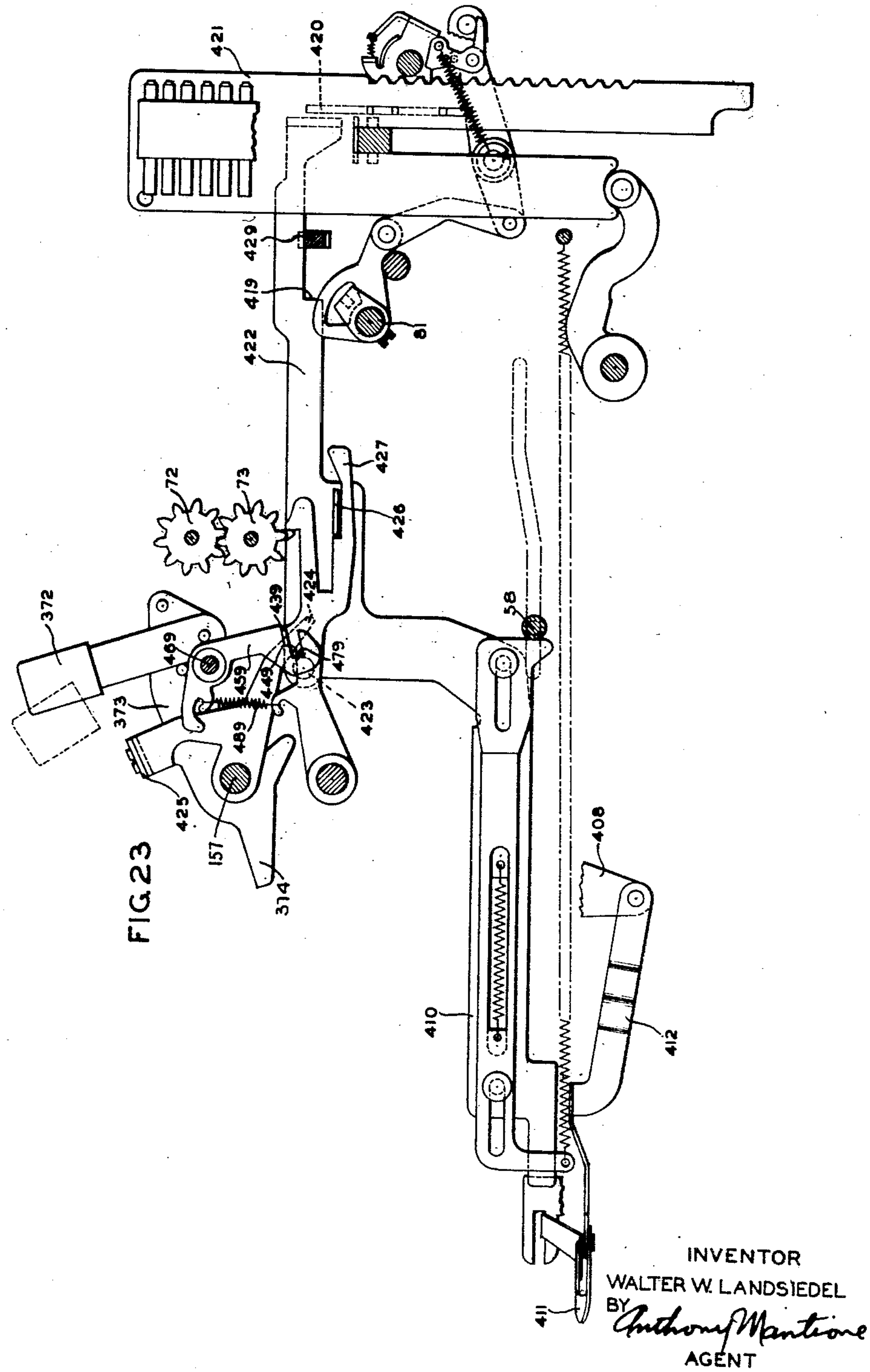
Fig. 23 is a detail view showing the division automatic stop mechanism in a normal position.
Figure 24:
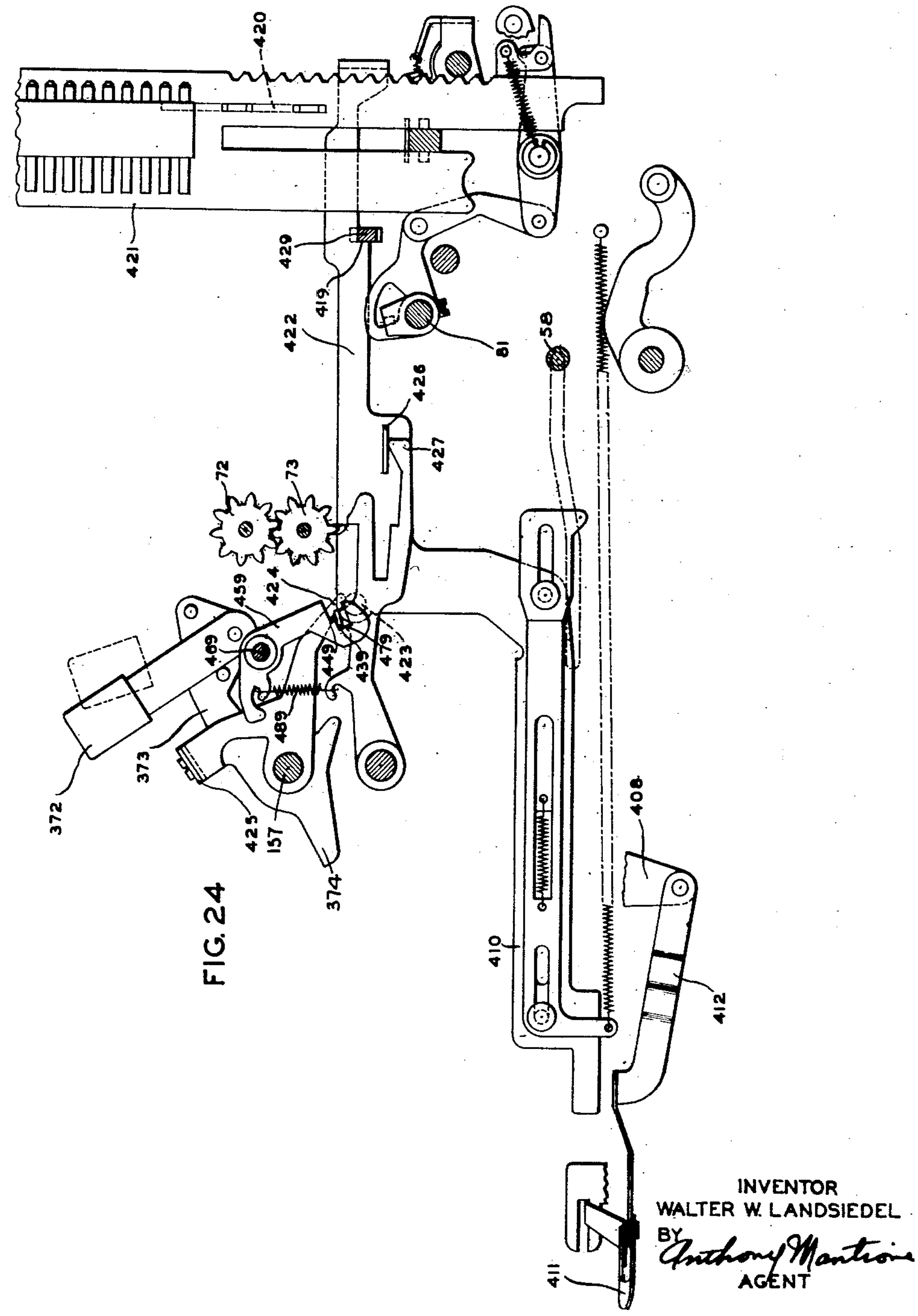
Fig. 24 is a detail view showing the division automatic stop mechanism of Fig. 23 in operating position.

Referring to Figs. 23 and 24 of the present application, it will be seen that the motor control slide 410, the actuation of which is disclosed in said latter patent, will at this time travel forwardly to strike a motor control arm 411. Said arm is pivotally connected to the motor control link 412, which is pivotally connected to a four-armed division shaft latch unit 408 (Fig. 3). It is apparent, therefore, that when the motor control slide 410 is moved forwardly it will rock the motor control arm 411 counter-clockwise as seen in the plan view (Fig. 4), thereby urging the link 412 rearwardly to rock the division shaft latch 408 counterclockwise, as seen in Fig. 3. As the latch 408 turns counter-clockwise, its latch arm 413, will now unlatch the arm 385 of the division shaft lever 384. During all subtract operations forming a phase of a division problem the arm 413 latches the arm 385 of the division shaft lever 384.

As the rearward arm 386 of the lever 384 can now drop to its normal position, its carriage disabling link 390 and its formed ear 399 (Fig. 29) will be lowered to release the extended arm 409 of the bail crank 193. The bail crank 193, as previously described under the heading "Automatic printing during multiplication," raises and lowers the vertical pin 194 as in Fig. 11 to disable the carriage restoring mechanism. As the pin 194 is now lowered to normal position it will permit the carriage restoring mechanism to function and return the carriage to its normal restored position. Since the total lock link 318 has, at this time, not returned to normal, the machine continues operating for two additional strokes. This is effected through a latch lever 414 (Figs. 3, 28 and 29), an ear 415 of which supports a latch 416, thereby retaining the link 388 which, although it has been permitted to drop to normal by the division shaft lever 384, nevertheless remains latched on the ear 415. In such latched position, the stud 163 is held by the slotted portion of the link 388, thereby retaining the triple-armed bell-crank lever 149 in its revolved operating position which retains the link 138 in its forward motor operating position. At this time the carriage has restored but the total lock link 318 has not (Figs. 21 and 22). Consequently the first cycle of the two additional strokes to be effected, will be a blank stroke. The previously described arm 321 will block the total lock link 318 by means of its formed ear 320 which is engaged by the slot 330 of the total link. The subsequent and final stroke, as is old in the art, is always a totaling stroke. The total link 318 (Fig. 2) will now be carried rearward, thereby picking up the stud 315 to revolve the triple-armed latch lever 266 counter-clockwise. The triple-armed latch lever 266 is securely fixed to the shaft 267 (Fig. 2 and plan view Fig. 4) which extends across the machine to the right-hand side (Figs. 3 and 28) where it emerges and fixedly carries the previously described arm 268. Consequently, when the triple-armed latch lever 266 of Figs. 2, 21 and 22 rocks counter-clockwise, its shaft 267 will rock the arm 268 (Figs. 3 and 28) clockwise so that its fixed stud 417 will operate in the slot 418 of the previously described latch lever 414. Continued movement of the stud will immediately carry the latch 414 clockwise so that its ear 415 will release the latch 416 of the link 388. As the link 388 is freed to drop to normal, its lower slotted portion will permit the stud 163 to drop downwardly and thereby permit the triple-armed lever 149 to swing to normal. As the triple-armed lever 149 can now revolve clockwise back to its normal position, it releases the link 138, thereby opening the motor contacts to stop the motor. Inasmuch as the final cycle consisted of a totaling stroke, it printed the undividable remainder left in the accumulator wheels and automatically cleared the machine for a new problem.

*Release key (division)*

Figure 18:
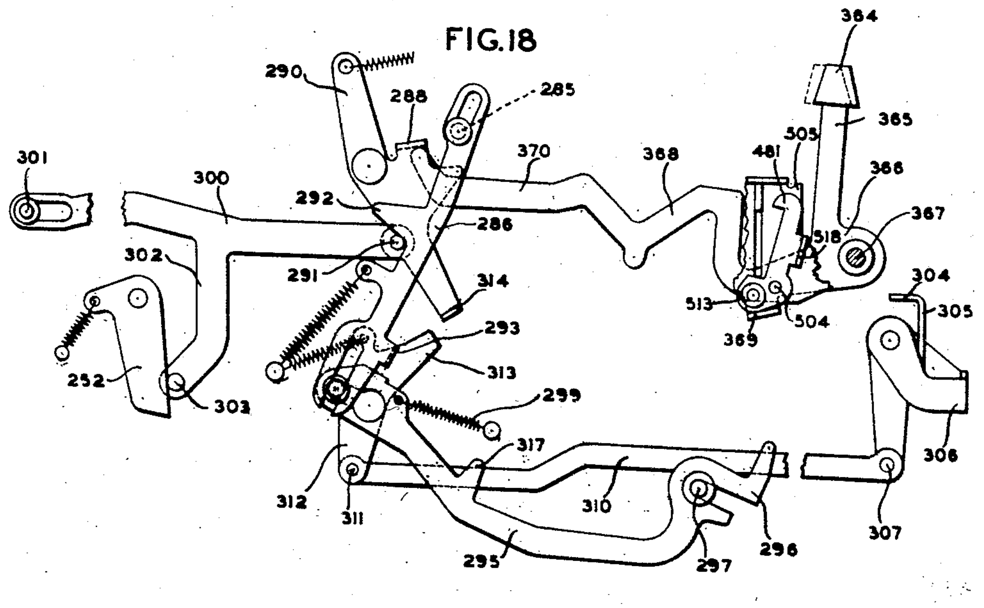
Fig. 18 is a detail left-hand side view of the multiply and division release key mechanism of Fig. 17 in an operative position.

Stopping of the machine at any point during the course of a division problem is accomplished through the mechanism disclosed in Figs. 17 and 18. By operating the release key 364 hereinbefore referred to, the extension 370 will raise the ear 288 of the rocker arm 290. The rocker arm 290, will, as a consequence, be revolved counter-clockwise as in Fig. 18, thereby drawing the back-space blocking link 300 frontwardly to release the inner back-space control pawl 252. This, as has previously been explained, will disable the back-space lever 245 and cause the machine to restore on the next add-in operation, following which the machine will blank stroke and total out the remainder.

*Division automatic stop mechanism*

There is disclosed in the present application mechanism which provides for the automatic stoppage of the machine in the event that the division lever 372 should be tripped while the machine is clear or whenever a dividend and a divisor have not been entered on the keyboard. As soon as the division lever 372 has been tripped with the machine in a clear condition, i. e., without a dividend entered in the accumulator and a divisor registered on the pin carriage, the machine will, nevertheless, commence to operate and the quotient type rack 421 will immediately ascend one digit for each cycle of machine operation.

Referring now to Figs. 23 and 24, the quotient rack 421 has securely riveted to its left-hand side, a flat metal strip 420. A special control slide 422 is provided with a shoulder 419 which forms a rearward limit whenever the special slide 422 is thrust rearwardly to engage a cross bar 429. As soon as the division lever 372 has been tripped with the machine in a cleared condition, the quotient rack 421 will, as above explained, start ascending one digit on each cycle of machine operation. When the quotient rack 421 has risen vertically more than a distance equivalent to twelve type, the aggregate number of slidable type carried thereon, its metal strip 420 will clear the path for a fan tailed extremity of the special slide 422, allowing it to travel rearwardly as in Fig. 24, i. e., whenever the rack restoring bail 58 moves in its rearward path, which occurs once during each forward stroke of the main shaft 81. As the slide 422 moves rearward, a stud 423 fixed thereto will strike an arm 424 of a bail 425, of which the division lever 373 forms a part. As a result of the arm 424 being carried rearward, this arm, which is loosely pivoted on the shaft 157, will swing the bail 425, counter-clockwise (Fig. 24) to restore the division lever 373 to its normal position. In the machine of the aforesaid Patent 2,255,622, it was necessary at this point for the operator to restore the division lever manually to its normal position, whereas the machine of the present application effects this operation automatically. During the rearward travel of the special control slide 422, a metal lug 426 securely fixed to the right-hand side of the slide, will cam down a carry pawl 427. An ear 439, formed on the carry pawl 427 serves to abut against a shoulder 449 of a carry pawl latch 459 and retains the latch 459 in the position shown in Fig. 24. As soon as the carry pawl 427 has been depressed by the lug 426, the ear 439 will drop sufficiently to clear the shoulder 449, thereby permitting the carry pawl latch 459 to revolve counter-clockwise on its shaft 469 under tension of a spring 489. The ear 439 has now entered a slot 479 of the carry pawl latch 459 and in this manner said ear will latch the carry pawl 427 in this lowered operating position. Upon the return stroke of the previously mentioned cycle wherein the division lever 373 had been restored, the slide 422 has moved an extra step toward the front of the machine, inasmuch as it could now clear the shoulder of the carry pawl 427. As the special control slide 422 travels to its extreme forward position, it strikes the motor control arm 411, which as described in the above Patent 2,255,622, will consequently unlatch the division mechanism through the motor control link 412, which rocks the latch 408, thereby unlocking the arm 413 (Fig. 3) from the division shaft lever 394. With the division mechanism unlatched by the four-armed member 408 and the division lever 372 restored to normal, the machine will stop as described in the present application under the heading "Division mechanism," after a blank stroke and total operation. Provisions for returning the carry pawl latch 459 back to its normal position, i. e., with its shoulder 449 abuting the ear 439 of the carry pawl 427, is made in the form of a reciprocating bail 508 (Fig. 1) which is adapted through motion derived from a cam (not shown) fixed to the main shaft to lift the upper arms of the carry pawl latches 459 once during the latter half of each machine cycle.

*Decimal printing mechanism*

Figures 25, 26:
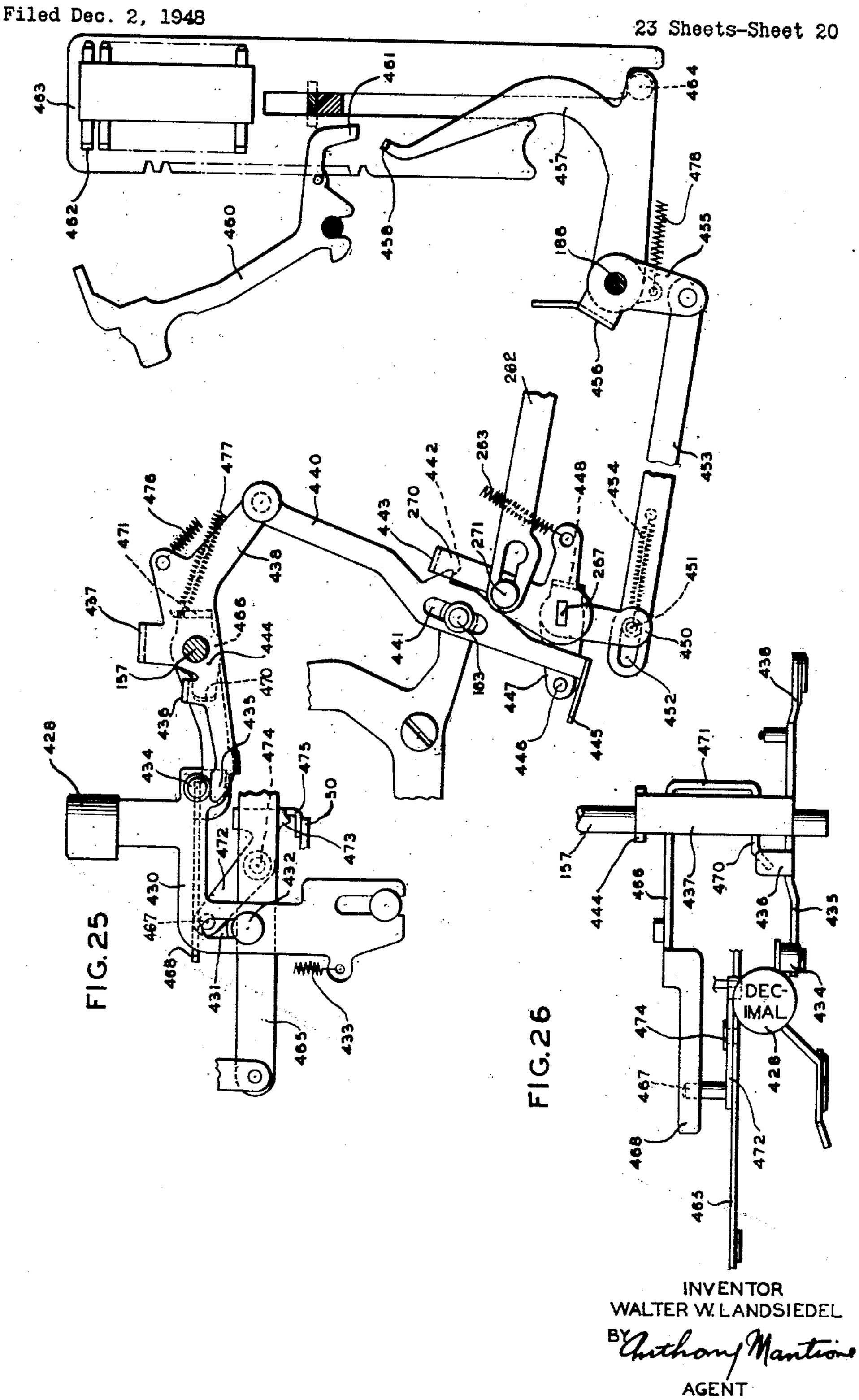
Fig. 25 is a detail right-hand side view of the decimal printing mechanism in normal position.
Fig. 26 is a partial top plan view of the decimal printing mechanism shown in Fig. 25.

Referring now to Figs. 25, 26 and 27, there is shown a decimal printing key 428 securely mounted to the decimal key stem 430. The stem 430 is formed with a slot 431 adapted to receive a stud 432 which is secured to the outer right-hand frame. The stem 430 is slidably mounted on the stud 432, and a spring 433, one end of which is anchored to the frame member 77, is provided to retain the key stem in its upper normal position. When the decimal key 428 is depressed (Fig. 27), a roller 434, rotatably mounted on the rearward portion of the stem 430, depresses an arm 435 of a lever 444 having an offset 436 and a decimal operating bail 437. The lever 444 is pivoted on the subtraction shaft 157. As the arm 435 is depressed, the rearward arm 438 of lever 444 lifts the decimal key link 440 upwardly. The decimal key link 440 is formed with a slot 441 within which rides the previously described pin 163. As the link 440 is carried upwardly, its formed ear 442 is lifted above and latched (Fig. 27), upon the bent end 443 of the latch 270. It will be seen also (Fig. 27), that the link having the slot 441 has lifted the pin 163 of the previously described triple-armed bell-crank lever 149, thereby rocking said lever to close the motor contacts through the link 138. Formed on the lower end of the decimal key link 440 is an ear 445 which underlies a stud 446 fixedly carried by a decimal print bell-crank 447. The decimal print bell-crank 447 is pivoted on the shaft 267 (Fig. 4). Therefore, when the link 440 is raised, its ear 445 will elevate the stud 446, thereby rocking the bell-crank 447 clockwise as seen in Fig. 27. The bell-crank 447 is formed with a bail portion 448 having an arm 450 with a fixed stud 451. The stud 451 is slidably fitted in a slot 452 formed in a hammer block arm link 453. A spring 454, one end of which is anchored to the stud 451 while the other end is secured to the link 453. When, however, the bail 448 is rocked clockwise as seen in Fig. 27, then the hammer block arm link 453 will be drawn forwardly. Link 453 is pivotally connected to the arm 455 of the bail 456, one end of which forms the hammer block arm 457. The arms 455 and 457, joined by the bail 456, are loosely pivoted on the previously described shaft 136. As link 453 is drawn forwardly, bail 456 will, as a consequence, be rocked clockwise to swing the hammer block arm 457 rearwardly. An ear 458, formed on the upper extremity of the hammer block arm 457, normally blocks any movement of the quotient printing hammer 460. The hammer block arm 457 is now swung clockwise as in the operative view (Fig. 27), to clear the extension 461, and the quotient printing hammer 460 is now free to travel forwardly to strike the decimal printing type 462, which is the uppermost type member carried by the dial rack 463. A stud 464, fixed to the hammer block arm 457 is provided to limit counter-clockwise revolution of the block arm 457 when the dial rack 463 is in its lowermost position. Should the dial rack 463 be raised for the printing of digits, then the block arm 457 can swing clear of the dial printing hammer 460.

Depression of the decimal printing key 428, which actuates the motor to cycle the main shaft 81, ordinarily would cause a totaling operation were it not for certain other mechanism now to be described. Such an operation would not be desired when indicating a decimal point, and mechanism for preventing a totaling operation is provided as follows:

*Total preventing during decimal printing*

Referring now to Figs. 25 and 26, a blank stroke lock link 465 is disclosed with a latch lever 472 pivoted thereto at 474. The latch 472 carries a fixed stud 467, underlying the tabular-shaped extension 468 of a trip arm 466. In order to prevent a totaling operation the blank stroke lock link 465 is released by the trip arm 466 in the following manner. Upon depression of the decimal key 428, the arm 435 with its ear 436 will be moved downwardly. As a result the ear 436 will also depress the underlying ear 470 (Fig. 26) of the trip arm 466. The trip arm 466 is formed with a bail 471 which is loosely pivoted on the shaft 157. Upon the depression of the trip arm ear 470, the tabular extension 468, which forms part of the bail 471, will depress the stud 467 fixed to the latch lever 472, causing the latch lever 472 to be rocked counter-clockwise as in Fig. 27. Since the latch lever 472 is revolvably carried by the pivot 474 on the total lock link 465, rocking of the latch lever 472 counter-clockwise will raise a latch portion 473 from an ear 475 fixed to the carriage 50. This will unlatch the blank stroke lock link 465, permitting it to be drawn rearwardly by spring action (not shown) to prevent the customary totaling operation which occurs when the machine is cycled during its normal restored condition.

Release of the decimal printing mechanism is effected automatically by the latch release link 262 (Fig. 27). As previously explained, the front end of the link 262 is slidably connected to the stud 271 which is fixedly carried by the latch lever 270, and the rear end of the link 262 is pivotally connected to the stud 119 of the motor drive contact mechanism (Fig. 8). When the contact bail 111 is rocked counter-clockwise to break the electrical contacts, the stud 119, which is carried on the depending arm 120 (Fig. 8) of the bail member 114, will draw the latch release link 262 rearwardly. As the link 262 moves in the rearward direction, its forward end will draw the stud 271 rearward, thereby pulling the ear 443 of the latch lever 270 out from under the ear 442. The decimal key link 440 will now be unlatched to drop to its normal position. The bail 437, the link 453, and the bail 456 are now restored to normal position by means of frame anchored springs 476, 477 and 478, respectively.

Through the foregoing mechanism the decimal print hammer block arm 457 is used as a hammer latch to block the decimal print hammer 460. Its construction is such that it permits the decimal print hammer to fire at two different occasions; i. e., when an item is in the dial rack 463, the decimal print hammer block arm 457 will be free to move to the front of the machine and allow the decimal print hammer to fire; and when the dial rack 463 is in its normal unelevated position and the decimal key 428 is depressed, then the decimal print block arm 457 will move to the rear of the machine and allow the decimal print hammer 460 to fire and print the decimal character.

*Decimal locating mechanism for division*

Returning now to the decimal locating mechanism which was partially described earlier in the present application in connection with multiplication: Fig. 19, as earlier discussed, discloses a combination of left and right-hand decimal pointers 356 and 357, a quotient scale 362, and a decimal indicator 361, all of which, in combination with the decimal printing mechanism just described, form an efficient apparatus for pre-determining identifying and printing of decimals in the performance of division problems.

Considering the example 9.876543 which is to be divided by the sum of 7.89. To employ the prefixed decimal feature of the present machine, the dividend 9.876543 is entered on the keyboard and the add-total key is depressed once. The left vertical index pointer 356 (Fig. 19) is then moved leftwardly to the dividend decimal point. The right vertical index pointer 357 is then moved leftwardly to a distance equal to the number of divisor decimal places. The next step consists in subtracting mentally the number of decimals in the divisor 7.89 from the number of decimals in the dividend 9.876543. This is easily accomplished by noting the position of the vertical wire index pointers 356 and 357 beneath the value gauge 363. The difference is ascertained immediately by glancing at the value gauge which in the present problem would indicate a difference of a 4. Then the decimal indicator 361 at the left-hand side of the machine is positioned over the corresponding number (4) of the quotient scale 362. The decimal indicator will then point to the correct decimal location in the quotient as it will be printed upon the paper tape. Now, in order to print the decimal character at this point, the decimal indicator 361 is moved upwards out of the space in which the quotient will be printed. The tape is then adjusted or moved upwards manually one line space, the decimal key 428 is next depressed causing the decimal type 462 to be struck by the hammer 460 effecting printing of the decimal point in its proper position. The tape is then readjusted to its former position and the division key 372 is next depressed automatically causing the problem to be divided out completely with the decimal point correctly located and printed between the first and second digits of the quotient on the left-hand side of the tape.

*Combined sub-total and non-add key*

In the machine disclosed in the above Patent No. 2,237,881, individual keys were provided for effecting a sub-total operation separately from a non-adding operation. In the sub-total operation of the aforementioned machine the add-total bar was depressed for one stroke followed by a depression of the sub-total key and finally the add-total bar. This procedure was required to effect a sub-total operation, i. e., whenever it was desired to print the amount accumulated in the machine without clearing the machine. In the case of a non-add operation, an individual non-add key was disclosed, the effect of which permitted any amount depressed upon the keyboard to be printed without entering the amount into the accumulator wheels.

In the machine of the present application, the stop carriage 50 (Figs. 25, 27 and 32) has attached to its upper surface near its rear right-hand corner the previously mentioned ear 475 cooperable with the latch lever 472 which is pivoted at 474 to the rearwardly extending blank stroke lock link 465. As disclosed in the above Patent No. 2,255,622, the blank stroke lock link 465 is actuated by a cam (not shown) on the main shaft 81 which, whenever the blank stroke lock link 465 is in its rear unlatched position, will be cammed forwardly once during each machine cycle. At its front end the blank stroke lock link 465 is pivoted to an arm 482 which is securely fixed to the transverse rock shaft 483. The rock shaft 483 is positioned directly beneath the keyboard plate as shown partially in Fig. 5. If, as described in the above patent, any numeral key is depressed, the stop carriage 50 will move to the left carrying its flanged ear 475 out of engagement with the latch lever 472 and the blank stroke lock link 465 then will be moved rearwardly under tension of the spring 484, to thereby rock the shaft 483. As shown in Fig. 32, the transverse rock shaft 483 carries a fixed arm 485 which is pivotally connected to a locking slide 486, mounted for front to rear movement on a bracket 487. When the lock slide 486 is moved rearwardly (through unlatching of the blank stroke lock link 465 and the consequent rocking of the shaft 483) the lock slide 486 will become wedged under a lever 488 which is normally held in raised position by a spring 490. The lever 488 is thereby locked against any downward motion and it is so locked during each computing cycle of the machine. A bail shaped lever 491 which is pivoted on a shaft 492 is formed with an arm 493 which projects through a rectangular opening 494 in the lever 488. The bail shaped lever 491 has a depending arm 495 to which is pivoted the forward end of a total lock link 496. Overlying the total lock link 496 are the arms 497 and 498 which form parts of key stems 500 and 501 respectively. The key stem 500 is actuated by the non-latchable key 209 which is designated (Figs. 6 and 32) as the "Sub-total X" (multiplication sub-total) key. The stem 501 carries the combined non-add and sub-total (NA—ST) key 208. Whenever it is desired to record a number, listing it, and at the same time non-adding it, so that it is not included in either sub-totals or totals, the number is entered on the keyboard, the combined non-add and sub-total key 208 is depressed, and then the add-total bar 152 is finally depressed. As already explained, depression of any numeral key will unlatch the blank stroke lock link 465, causing the consequent rocking of the transverse shaft 483 and the positioning of the wedge shaped lock slide 486 under the lever 488 thereby locking the total link 496. When the combined non-add sub-total (NA—ST) key is depressed its arm 498 will depress an arm 502 of the non-add and sub-total lever 503. As disclosed in the above Patent No. 2,237,881 the non-add and sub-total lever is pivoted to a sub-total and non-add cam slide which controls a non-add cam (Fig. 12 of Patent No. 2,237,881) which cam is moved to a rearward position by depression of either the non-add or the sub-total key. As disclosed therein, a stud carried by the wipe pawl, which pawl is old in the art, contacts the non-add cam and consequently holds the wipe pawl up so that it will not operate the accumulator cam on the return stroke of the main shaft. The above structure although not shown completely in the present drawings, functions in a similar manner with respect to the accumulator plate, the wipe pawl, and the non-add cam as is fully shown and described in the above Patent No. 2,237,881.

The combined (NA—ST) non-add and sub-total key 208 of the present machine is held latched in its depressed position by means of the release latch 481 shown in Figs. 17 and 18. The latch 481 is pivoted at 504 to a bracket 505 which is suspended from the undersurface of the lower keyboard. A hook shaped portion 506 of the latch 481 is adapted to engage a notched shoulder 507 (Fig. 32) of the arm 498. The non-add, sub-total key 208 is held in its depressed latched position by means of a spring 511, one end of which is suitably connected to the keyboard and the other end connected to the rearward end of a release arm 512 the forward end of which is pivotally connected to the stud 513. The latch 481 is released from its latched position by means of a link 514 the function of which is fully disclosed in the above Patent 2,237,881. Towards the completion of a non-add or sub-total operation the link 514 will be urged forwardly through actuation of a plate cam (not shown in the present drawings) fixed to the main shaft 81. The link 514 is slidably supported upon a pin 515, which rides within a slot 516 formed on the link. At its forward end, the link 514 carries a raised lamination 517 which is adapted to strike an ear 518 of the latch 481. As this operation occurs once during a portion of each cycle of the main shaft 81, it will cause a clockwise movement of the release latch 481 sufficient to unlatch the hooked portion 506 of the latch from the notched shoulder of the arm 497.

Should the non-add sub-total key 208 become accidentally latched by error or otherwise, it can be released without cycling the machine by manually actuating the release lever key 364 (Figs. 17 and 18). The key 364 rocks the lever 366 which is fulcrumed on the shaft 367, thereby lifting an ear 369 upwardly to rock the latch 481 clockwise (Fig. 18). This operation, as in the previously described cam operated method, will immediately unlatch the hook shaped member 481 from the notched shoulder 507 of the arm 498 (Fig. 32).

In the normal operation of the machine, whenever the add-total bar is depressed to register an amount which has been entered on the keyboard, the total lock link 496 will cause the accumulator plate to rock thereby raising the accumulator during the first portion of an add cycle, as the actuating racks travel rearwardly. On the return stroke of the actuating racks, the accumulator is automatically dropped through action of the wipe pawl mechanism, thereby permitting the returning racks to enter the amount in the accumulator wheels. In the usual non-add operation, the amount is not entered by reason of the fact that the non-add cam has been positioned in the path of the wipe pawl, which normally causes the accumulator wheels to drop into engagement with the actuating racks after they have been fully returned. The only effect, therefore, will be the printing operation without entering the amount into the accumulator. As a consequence of the accumulating wheels not being revolved on the final portion of the cycle, the item will have been printed but not accumulated.

To effect a sub-total operation with the same key 208 during addition, it is merely necessary to take a blank stroke first by depressing the add-total bar once, then depressing the non-add sub-total key 208, and once more the add-total bar. The first mentioned blank stroke causes the latch lever 472 to latch onto the ear 475, and also actuates the total link 496 to rock the accumulator plate. This will cause the accumulator to remain in mesh on the rearward stroke of the actuating racks. The rearwardly traveling racks will advance a distance equivalent to the amounts stored in the accumulator, i. e., they will "roll out" the total stored therein and cause this figure to be printed. The depression of the combined non-add sub-total key 208 has, at this time, interposed the previously mentioned non-add cam in the path of the wipe pawl. The accumulator, as presently described, has been in mesh with the slide racks during the usual down stroke of the wipe pawl. On the upward stroke of the wipe pawl, the non-add cam (which has been pushed rearward through action of the depressed NA-ST key 208) will cause the wipe pawl, as it traverses over the non-add cam, to retain the accumulator wheels in mesh with the returning slide racks. The effect of this operation will result in causing the amount or total which has just been printed, to be entered back into the accumulator. More specifically, the two blank strokes will effect the usual totaling operation which automatically is followed by a clearing of the machine after the total is printed, but the depression of the combined non-add, sub-total (NA-ST) key 208 after the blank stroke prevents the accumulator from rising during the return of the actuating racks. Consequently, the usual clearing of the accumulator does not take effect.

In the machine disclosed in the above Patent No. 2,280,920 (Fig. 8 therein) the use of the non-add key to obtain sub-totals would not have been possible inasmuch as the tab-shaped step disclosed therein as projecting upwardly from the total lock link, would move under the non-add key stem, thereby preventing the non-add key stem from being depressed so as to actuate the non-add key when the former sub-total key was depressed. This condition has been eliminated through a re-design of the total link 496 as shown in Fig. 32.

The multiplication sub-total key 209, its stem 500, and the formed arm 497, is similar in operation to the key 208, with the main exception being that it is non-latchable. It is designed to spring back to its non-depressed position (through a coiled spring not shown) immediately upon its release. If the key 209 were latchable, as in the case of the NA-ST key 208, the tendency would be to hold the key down too long which would permit the machine to non-add the subsequent operation after a multiplication subtotal had been effected. In order to obtain a subtotal during a series or a chain of multiplication problems, as for example the computation of an inventory involving various cost prices and a variety of quantities, it is merely necessary to depress and hold the multiply sub-total key 209 down immediately after releasing the multiply lever 164 for the last multiplier digit. As soon as the sub-total is delivered, the key 209 is released and the multiplication operation can be resumed, inasmuch as the amount or product has been reinserted in the accumulator.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

Having thus described my invention, I claim:

1. In a printing calculating machine of the class described; the combination with a record sheet and means for printing on said sheet the digits of a quotient arranged one under another and a respective divisor opposite each quotient digit; of means for determining the location of the decimal point on the quotient, said means including a plurality of index pointers movable to various positions relative to the printed divisors, a graduated scale member positioned adjacent the digits of said quotient, and a slidable index member adapted to traverse the graduated scale member and the digits of said quotient.

2. In a printing calculating machine of the class described; the combination with a record sheet and means for printing on said record sheet the digits of a quotient arranged one under another and a respective divisor opposite each quotient digit; of means for predetermining the location of the decimal point on the quotient, said means including a plurality of index pointers movable to various positions relative to the printed divisors, a graduated scale member positioned adjacent the digits of said quotient, and a slidable index member adapted to traverse the graduated scale member and the digits of said quotient; normal ineffective means for printing a character indicating said predetermined location; a key; and means operable under control of said key for rendering said character printing means effective.

3. In a printing calculating machine of the class described, means for pre-fixing on a record sheet a decimal point location for the quotient, said pre-fixing means including a paper table, a pair of tracks and a graduated quotient scale carried by said table, a pair of linear pointers movable on one of said tracks and extending over the dividend and divisor areas of said table, and a pointer movably carried on the other track and cooperating with said quotient scale for indicating the decimal location on the quotient.

4. In a printing calculating machine wherein problems of division and multiplication may be performed, the combination of a main operating mechanism, an accumulator mechanism, means for causing a total to be taken from said accumulator mechanism automatically by repeated operation of said main operating mechanism, means for printing decimal point positions on printed records of division problems performed in said machine, a decimal printing key for operating said decimal point printing means, and means under control of said decimal point printing means for disabling said first mentioned means and thereby prevent the automatic taking of a total when the decimal printing key is operated.

References Cited in the file of this patent

UNITED STATES PATENTS

| Number | Name | Date |
|---|---|---|
| 1,050,845 | Pike | Jan. 21, 1913 |
| 1,115,889 | Benner | Nov. 3, 1914 |
| 1,197,277 | Ellis | Sept. 5, 1916 |
| 1,318,798 | Quentell | Oct. 14, 1919 |
| 1,503,742 | Bacon | Aug. 5, 1924 |
| 1,851,401 | Munzer | Mar. 29, 1932 |
| 1,857,202 | Lee | May 10, 1932 |
| 1,857,790 | Pasinski | May 10, 1932 |
| 1,865,553 | Berger | July 5, 1932 |
| 1,910,738 | Avery | May 23, 1933 |
| 1,949,445 | Barrett | Mar. 6, 1934 |
| 1,964,975 | Britten, Jr. | July 3, 1934 |
| 1,993,626 | Robertson | Mar. 5, 1935 |
| 2,014,013 | Avery | Sept. 10, 1935 |
| 2,048,453 | Kall | July 21, 1936 |
| 2,203,336 | Landsiedel | June 4, 1940 |
| 2,237,881 | Landsiedel | Apr. 8, 1941 |
| 2,255,622 | Landsiedel | Sept. 9, 1941 |
| 2,266,182 | Ewald | Dec. 16, 1941 |
| 2,340,261 | Eichler | Jan. 25, 1944 |
| 2,374,333 | Crosman | Apr. 14, 1945 |
| 2,424,359 | Liljestrom | July 22, 1947 |
| 2,442,456 | Boyden | June 1, 1948 |
| 2,645,418 | Fleming | July 14, 1953 |